(12) United States Patent
Shintani

(10) Patent No.: US 12,496,816 B2
(45) Date of Patent: Dec. 16, 2025

(54) LAMINATED BODY PRESSING APPARATUS, PRESSED STRIP-SHAPED LAMINATED BODY MANUFACTURING METHOD, LAMINATED ELECTRODE BODY MANUFACTURING METHOD, AND BATTERY MANUFACTURING METHOD

(71) Applicant: TOYOTA JIDOSHA KABUSHIKI KAISHA, Toyota (JP)

(72) Inventor: Kodai Shintani, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 286 days.

(21) Appl. No.: 18/050,605

(22) Filed: Oct. 28, 2022

(65) Prior Publication Data
US 2023/0072371 A1  Mar. 9, 2023

Related U.S. Application Data

(62) Division of application No. 16/686,851, filed on Nov. 18, 2019, now Pat. No. 11,518,156.

(30) Foreign Application Priority Data

Jan. 14, 2019  (JP) ................. 2019-003978

(51) Int. Cl.
*B32B 37/00* (2006.01)
*B32B 38/00* (2006.01)
(Continued)

(52) U.S. Cl.
CPC ...... *B32B 37/0053* (2013.01); *B32B 38/0004* (2013.01); *H01M 4/0435* (2013.01);
(Continued)

(58) Field of Classification Search
USPC ............... 156/297, 299, 300, 301, 302, 303
See application file for complete search history.

(56) References Cited

U.S. PATENT DOCUMENTS 2,697,236 A   12/1954 McCain et al.
3,300,826 A    1/1967 Thomas
(Continued)

FOREIGN PATENT DOCUMENTS

JP   2009-166488 A   7/2009
JP   2017-062871 A   3/2017
(Continued)

OTHER PUBLICATIONS

English machine translation: WO 2019083174A1; Ko; May 2, 2019; 9 pages. (Year: 2019).*

(Continued)

*Primary Examiner* — Linda L Gray
(74) *Attorney, Agent, or Firm* — Dickinson Wright, PLLC

(57) ABSTRACT

A laminated body pressing apparatus, which can restrain damage of a first outer ridge portion or a second outer ridge portion of a positive electrode plate during roller-pressing and can restrain damage of a strip-shaped first separator of a strip-shaped negative electrode body on a positive electrode plate side, includes a first press roller, a second press roller disposed parallel to the first press roller and spaced apart from the first press roller by a roller gap, and a metal plate feeding unit to feed a strip-shaped metal plate extending in a conveyance direction to the roller gap. The apparatus roller-presses the positive electrode plate and the strip-shaped negative electrode body by the first press roller and the second press roller in a state where the strip-shaped metal plate fed by the metal plate feeding unit is placed on the positive electrode plate placed on the strip-shaped negative electrode body.

4 Claims, 11 Drawing Sheets

(51) Int. Cl.
- H01M 4/00 (2006.01)
- H01M 4/04 (2006.01)
- H01M 50/00 (2021.01)
- B29C 65/00 (2006.01)

(52) U.S. Cl.
CPC ........... *B29C 66/95* (2013.01); *B32B 2457/10* (2013.01); *H01M 50/00* (2021.01); *Y10T 156/1097* (2015.01)

(56) References Cited

U.S. PATENT DOCUMENTS

| | | | | |
|---|---|---|---|---|
| 5,149,394 | A | * | 9/1992 | Held ........................ B32B 37/20 425/371 |
| 5,824,178 | A | * | 10/1998 | Shingu .................. B29C 70/202 156/266 |
| 6,234,304 | B1 | | 5/2001 | DeGroot et al. |
| 10,084,200 | B2 | | 9/2018 | Ko et al. |
| 2002/0050445 | A1 | | 5/2002 | Shaffer |
| 2012/0125736 | A1 | | 5/2012 | Twigger et al. |
| 2016/0111699 | A1 | * | 4/2016 | Ahn ..................... H01M 50/461 429/211 |
| 2017/0084897 | A1 | | 3/2017 | Umehara et al. |
| 2018/0316042 | A1 | | 11/2018 | Kuhara |
| 2019/0252730 | A1 | | 8/2019 | Fujiwake et al. |

FOREIGN PATENT DOCUMENTS

| | | |
|---|---|---|
| JP | 2018-190495 A | 11/2018 |
| WO | WO-2019083174 A1 * 5/2019 | ............ H01M 10/04 |

OTHER PUBLICATIONS

Kodai Shintani, U.S. Appl. No. 18/050,602, Notice of Allowance dated Apr. 25, 2024.

Kodai Shintani, U.S. Appl. No. 16/686,851, Restriction Requirement dated Feb. 4, 2022.

Kodai Shintani, U.S. Appl. No. 16/686,851, Non-Final Office Action issued Apr. 14, 2022.

Kodai Shintani, U.S. Appl. No. 16/686,851, Notice of Allowance issued Sep. 16, 2022.

* cited by examiner

LAMINATED BODY PRESSING APPARATUS, PRESSED STRIP-SHAPED LAMINATED BODY MANUFACTURING METHOD, LAMINATED ELECTRODE BODY MANUFACTURING METHOD, AND BATTERY MANUFACTURING METHOD

CROSS-REFERENCE TO RELATED APPLICATIONS

This application is a division of U.S. patent application Ser. No. 16/686,851, filed Nov. 18, 2019, which claims priority to Japanese Patent Application No. 2019-003978, filed on Jan. 14, 2019, including the specification, drawings and abstract, the entire disclosure of which is incorporated herein by reference.

BACKGROUND

Technical Field

The present disclosure relates to a laminated body pressing apparatus and others for forming a pressed strip-shaped laminated body obtained by placing a plurality of rectangular positive electrode plates on a strip-shaped negative electrode body having a negative electrode plate disposed between a pair of strip-shaped separators in the longitudinal direction, and roller-pressing the positive electrode plates and the negative electrode body.

Background Art

A laminated electrode body, in which a plurality of rectangular positive electrode plates and a plurality of rectangular negative electrode plates are alternately laminated with rectangular separators interposed therebetween, is known as an electrode body for a battery such as a lithium ion secondary battery. Such a laminated electrode body is produced, for example, by the following method. Specifically, a strip-shaped negative electrode body having a negative electrode plate disposed between a pair of strip-shaped separators, and a plurality of rectangular positive electrode plates are prepared. Then, the plurality of positive electrode plates are placed on the strip-shaped negative electrode body at predetermined intervals so as to be spaced apart from each other by a gap in the longitudinal direction of the strip-shaped negative electrode body, to form a strip-shaped laminated body to be pressed.

Then, the strip-shaped laminated body to be pressed is roller-pressed using a laminated body pressing apparatus including a pair of press rollers, thereby press-contacting the plurality of positive electrode plates and the strip-shaped negative electrode body. Then, the pressed strip-shaped laminated body is cut to obtain rectangular plate-shaped unit laminated bodies. Then, the unit laminated bodies are laminated on each other to form the above-described laminated electrode body. Patent Document 1 describes a method for producing a laminated electrode body as described above (see FIG. 8, etc., of Patent Document 1).

RELATED ART DOCUMENTS

Patent Document

Patent Document 1: JP2018-190495A

SUMMARY

Technical Problems

However, due to roller-pressing, a ridge portion of each positive electrode plate may be damaged, or a strip-shaped first separator at the positive electrode plate side in the strip-shaped negative electrode body may be damaged. Specifically, a first outer ridge portion of the positive electrode plate formed by one first positive electrode plate principal surface exposed to the outside and a first positive electrode plate end surface facing the downstream side in a conveyance direction or a second outer ridge portion of the positive electrode plate formed by the first positive electrode plate principal surface and a second positive electrode plate end surface facing the upstream side in the conveyance direction may be damaged (for example, a part of a positive active material layer may fall off).

Moreover, it has been found that the strip-shaped first separator may be damaged (partially torn) at a portion where a first inner ridge portion of the positive electrode plate formed by another second positive electrode plate principal surface in contact with the strip-shaped negative electrode body and the above-described first positive electrode plate end surface or a second inner ridge portion of the positive electrode plate formed by the second positive electrode plate principal surface and the above-described second positive electrode plate end surface is in contact with the strip-shaped negative electrode body.

The reason why the first outer ridge portion or the second outer ridge portion of the positive electrode plate is damaged is considered to be that large pressure is applied to the first outer ridge portion or the second outer ridge portion during roller-pressing. In addition, when large pressure is applied to the first outer ridge portion or the second outer ridge portion of the positive electrode plate, the first inner ridge portion or the second inner ridge portion of the positive electrode plate presses the strip-shaped first separator of the strip-shaped negative electrode body with large pressure, and thus a portion of the strip-shaped first separator with which the first inner ridge portion or the second inner ridge portion of the positive electrode plate is in contact is considered to be damaged.

The present disclosure has been made in view of such circumstances, and provides: a laminated body pressing apparatus that allows a first outer ridge portion or a second outer ridge portion of a positive electrode plate to be restrained from being damaged during roller-pressing and allows a strip-shaped first separator at the positive electrode plate side of a strip-shaped negative electrode body to be restrained from being damaged during roller-pressing; a strip-shaped laminated body manufacturing method that allows a first outer ridge portion or a second outer ridge portion of a positive electrode plate to be restrained from being damaged during roller-pressing and allows a strip-shaped first separator of a strip-shaped negative electrode body to be restrained from being damaged during roller-pressing; a laminated electrode body manufacturing method that allows production of a reliable laminated electrode body in which damage to a first outer ridge portion or a second outer ridge portion of a positive electrode plate and damage to a strip-shaped first separator are restrained; and a battery manufacturing method that allows production of a reliable battery in which damage to a first outer ridge portion or a second outer ridge portion of a positive electrode plate and damage to a strip-shaped first separator are restrained.

Means of Solving the Problems

To solve the above problem, one aspect of the present disclosure is to provide a laminated body pressing apparatus for forming a pressed strip-shaped laminated body obtained by placing a plurality of rectangular positive electrode plates on a strip-shaped negative electrode body having a negative electrode plate disposed between a pair of strip-shaped separators at predetermined intervals so as to be spaced apart from each other by a gap in a longitudinal direction of the strip-shaped negative electrode body, and roller-pressing positive electrode plates and the negative electrode body, the laminated body pressing apparatus comprising: a first press roller; a second press roller disposed parallel to the first press roller with a roller gap therebetween; and a metal plate feeding unit configured to feed a strip-shaped metal plate extending in a conveyance direction to the roller gap, wherein in a state where the strip-shaped metal plate fed by the metal plate feeding unit is placed on the positive electrode plate placed on the strip-shaped negative electrode body, the positive electrode plate and the strip-shaped negative electrode body are roller-pressed by the first press roller and the second press roller.

The above-described laminated body pressing apparatus includes the above-described metal plate feeding unit in addition to the first press roller and the second press roller, and the positive electrode plate and the strip-shaped negative electrode body are roller-pressed by the first press roller and the second press roller in a state where the strip-shaped metal plate is placed on the positive electrode plate placed on the strip-shaped negative electrode body.

By interposing the strip-shaped metal plate as described above, a portion, of the positive electrode plate, pressed by the first press roller via the strip-shaped metal plate spreads in the conveyance direction (the area of the pressed portion is widened), and thus pressure applied to an outer ridge portion of the positive electrode plate (a first outer ridge portion formed by one first positive electrode plate principal surface exposed to the outside and a first positive electrode plate end surface facing the downstream side in the conveyance direction, or a second outer ridge portion formed by the first positive electrode plate principal surface and a second positive electrode plate end surface facing the upstream side in the conveyance direction) can be smaller than that in the conventional art. Therefore, damage to the first outer ridge portion or the second outer ridge portion of the positive electrode plate due to roller-pressing can be restrained.

When the pressure applied to the first outer ridge portion or the second outer ridge portion of the positive electrode plate is decreased, pressure with which an inner ridge portion of the positive electrode plate (a first inner ridge portion formed by another second positive electrode plate principal surface in contact with the strip-shaped negative electrode body and the above-described first positive electrode plate end surface, or a second inner ridge portion formed by the second positive electrode plate principal surface and the above-described second positive electrode plate end surface) presses a strip-shaped first separator at the positive electrode plate side of the strip-shaped negative electrode body is also decreased. Thus, damage to a portion of the strip-shaped first separator with which the first inner ridge portion or the second inner ridge portion of the positive electrode plate is in contact can also be restrained.

Examples of a metal plate used as the "strip-shaped metal plate" include a copper plate, a nickel plate, an aluminum plate, a stainless-steel plate, a titanium plate, and metal plates obtained by further forming a plating layer on the surfaces of these metal plates.

Examples of the strip-shaped metal plate include a strip-shaped metal plate having end portions that are not joined to each other, and an endless strip-shaped metal plate formed in an annular shape by joining both end portions of the strip-shaped metal plate to each other.

Examples of the "strip-shaped negative electrode body" include a strip-shaped negative electrode body in which separately produced strip-shaped separators are placed on both principal surfaces of a negative electrode plate, and a strip-shaped negative electrode body in which strip-shaped separator layers are formed on both principal surfaces of a strip-shaped negative electrode plate by applying a resin paste to both principal surfaces of the negative electrode plate and drying the resin paste.

Further, the above-described laminated body pressing apparatus is, preferably, the strip-shaped metal plate is an annular endless strip-shaped metal plate, and the metal plate feeding unit has a circulation path through which a downstream portion, of the endless strip-shaped metal plate, transferred to a downstream side in the conveyance direction of the roller gap is returned to an upstream side in the conveyance direction of the roller gap.

In the above-described laminated body pressing apparatus, since the annular endless strip-shaped metal plate is used as the strip-shaped metal plate and the metal plate feeding unit has the circulation path through which the endless strip-shaped metal plate is circulated, the endless strip-shaped metal plate (strip-shaped metal plate) can be easily repeatedly used, and roller-pressing can be efficiently performed to form the pressed strip-shaped laminated body.

Further, the above-described laminated body pressing apparatus is, preferably, the endless strip-shaped metal plate has a circumferential length that is an integer multiple of the predetermined interval, the endless strip-shaped metal plate has a joined portion at which both end portions of the strip-shaped metal plate are joined to each other, and the laminated body pressing apparatus further comprises: a joined-portion detection unit configured to detect a position of the joined portion of the endless strip-shaped metal plate; a positive electrode plate detection unit configured to detect a position of each positive electrode plate to be roller-pressed; and a control unit configured to control transfer of the endless strip-shaped metal plate, each positive electrode plate, and the strip-shaped negative electrode body by the first press roller and the second press roller and feed of the endless strip-shaped metal plate by the metal plate feeding unit such that a non-joined portion of the endless strip-shaped metal plate other than the joined portion is placed on a first outer ridge portion of the positive electrode plate formed by a first positive electrode plate principal surface exposed to the outside and a first positive electrode plate end surface facing the downstream side in the conveyance direction, and a second outer ridge portion of the positive electrode plate formed by the first positive electrode plate principal surface and a second positive electrode plate end surface facing the upstream side in the conveyance direction.

Since the joined portion of the endless strip-shaped metal plate is a portion at which both end portions of the strip-shaped metal plate are joined to each other, if the joined portion is placed on the first outer ridge portion or the second outer ridge portion of the positive electrode plate during roller-pressing, damage to the first outer ridge portion or the second outer ridge portion and damage to the strip-shaped first separator may be promoted.

In contrast, in the above-described laminated body pressing apparatus, the circumferential length of the endless strip-shaped metal plate is set to a length that is an integer multiple of the predetermined interval between the positive electrode plates placed on the strip-shaped negative electrode body, and the non-joined portion of the endless strip-shaped metal plate is made to be placed on the first outer ridge portion and the second outer ridge portion of the positive electrode plate (the joined portion is made not to be placed thereon) by the above-described joined-portion detection unit, the positive electrode plate detection unit, and the control unit. Accordingly, the first outer ridge portion or the second outer ridge portion of the positive electrode plate and the strip-shaped first separator can be appropriately restrained from being damaged during roller-pressing.

Further, the above-described laminated body pressing apparatus is, preferably, the strip-shaped metal plate has a thickness T1 that is three to eight times a thickness T2 of the positive electrode plate ($3 \times T2 \leq T1 \leq 8 \times T2$).

If the thickness T1 of the strip-shaped metal plate is excessively small, specifically, smaller than three times the thickness T2 of the positive electrode plate, the effect achieved by interposing the strip-shaped metal plate is reduced, and this leads to decrease in the effect of inhibiting damage to the first outer ridge portion or the second outer ridge portion of the positive electrode plate and damage to the strip-shaped first separator at the positive electrode plate side.

On the other hand, if the thickness T1 of the strip-shaped metal plate is excessively large, specifically, larger than eight times the thickness T2 of the positive electrode plate, the portion, of the positive electrode plate, pressed by the first press roller via the strip-shaped metal plate excessively spreads in the conveyance direction (the area of the pressed portion is excessively widened), and the pressure applied to the positive electrode plate is decreased. Thus, the close or hermetical adhesiveness of each positive electrode plate to the strip-shaped negative electrode body after roller-pressing is likely to be decreased.

On the other hand, in the above-described laminated body pressing apparatus, since the thickness T1 of the strip-shaped metal plate is three to eight times the thickness T2 of the positive electrode plate, the first outer ridge portion or the second outer ridge portion of the positive electrode plate and the strip-shaped first separator can be more effectively restrained from being damaged, and the close adhesiveness of each positive electrode plate to the strip-shaped negative electrode body after roller-pressing can be enhanced.

Another aspect of the present disclosure is a method for manufacturing a pressed strip-shaped laminated body formed by placing a plurality of rectangular positive electrode plates on a strip-shaped negative electrode body having a negative electrode plate disposed between a pair of strip-shaped separators at predetermined intervals so as to be spaced apart from each other by a gap in a longitudinal direction of the strip-shaped negative electrode body, and by roller-pressing the positive electrode plates and the strip-shaped negative electrode body, the method comprising a pressing step of, in a state where a strip-shaped metal plate extending in a conveyance direction is disposed on the positive electrode plate disposed on the strip-shaped negative electrode body, roller-pressing the strip-shaped metal plate, the positive electrode plate, and the strip-shaped negative electrode body by passing the strip-shaped metal plate, the positive electrode plate, and the strip-shaped negative electrode body through a roller gap between a first press roller and a second press roller disposed parallel to the first press roller, to form the pressed strip-shaped laminated body.

In the above-described method for manufacturing the pressed strip-shaped laminated body, the positive electrode plate and the strip-shaped negative electrode body are roller-pressed by the first press roller and the second press roller in a state where the strip-shaped metal plate is placed on the positive electrode plate placed on the strip-shaped negative electrode body.

By interposing the strip-shaped metal plate as described above, a portion, of the positive electrode plate, pressed by the first press roller via the strip-shaped metal plate spreads in the conveyance direction (the area of the pressed portion is widened), and thus the pressure applied to the first outer ridge portion or the second outer ridge portion of the positive electrode plate can be smaller than that in the conventional art. Therefore, damage to the first outer ridge portion or the second outer ridge portion of the positive electrode plate due to roller-pressing can be restrained.

When the pressure applied to the first outer ridge portion or the second outer ridge portion of the positive electrode plate is decreased, the pressure with which the first inner ridge portion or the second inner ridge portion of the positive electrode plate presses the strip-shaped first separator at the positive electrode plate side is also decreased. Thus, damage to the portion of the strip-shaped first separator with which the first inner ridge portion or the second inner ridge portion of the positive electrode plate is in contact can also be restrained.

In the above-described method for manufacturing the pressed strip-shaped laminated body, preferably, the strip-shaped metal plate is an annular endless strip-shaped metal plate, and the pressing step is performed while the endless strip-shaped metal plate is repeatedly placed on the positive electrode plate placed on the strip-shaped negative electrode body.

In the above-described method for manufacturing the pressed strip-shaped laminated body, the annular endless strip-shaped metal plate is used as the strip-shaped metal plate and the pressing step is performed while the endless strip-shaped metal plate is repeatedly placed on the positive electrode plate placed on the strip-shaped negative electrode body, and accordingly, the endless strip-shaped metal plate (strip-shaped metal plate) can be easily repeatedly used, and roller-pressing can be efficiently performed to form the pressed strip-shaped laminated body.

Further, in the above-described method for manufacturing the pressed strip-shaped laminated body, preferably, the endless strip-shaped metal plate has a circumferential length that is an integer multiple of the predetermined interval, the endless strip-shaped metal plate has a joined portion at which both end portions of a strip-shaped metal plate are joined to each other, and the pressing step is performed while a non-joined portion of the endless strip-shaped metal plate other than the joined portion is placed on a first outer ridge portion of the positive electrode plate formed by a first positive electrode plate principal surface exposed to the outside and a first positive electrode plate end surface facing a downstream side in the conveyance direction, and a second outer ridge portion of the positive electrode plate formed by the first positive electrode plate principal surface and a second positive electrode plate end surface facing an upstream side in the conveyance direction.

In the above-described method for manufacturing the pressed strip-shaped laminated body, the circumferential length of the endless strip-shaped metal plate is set to a length that is an integer multiple of the predetermined interval between the positive electrode plates placed on the strip-shaped negative electrode body, and the pressing step is performed while the non-joined portion of the endless strip-shaped metal plate is placed on the first outer ridge portion and the second outer ridge portion of the positive electrode plate (the joined portion is not placed thereon). Accordingly, the first outer ridge portion or the second outer ridge portion of the positive electrode plate and the strip-shaped first separator can be appropriately restrained from being damaged during roller-pressing.

Further, in the above-described method for manufacturing the pressed strip-shaped laminated body, preferably, the strip-shaped metal plate has a thickness T1 that is three to eight times a thickness T2 of the positive electrode plate ($3 \times T2 \leq T1 \leq 8 \times T2$).

In the above-described method for manufacturing the pressed strip-shaped laminated body, since the thickness T1 of the strip-shaped metal plate is three to eight times the thickness T2 of the positive electrode plate, the first outer ridge portion or the second outer ridge portion of the positive electrode plate and the strip-shaped first separator of the strip-shaped negative electrode body can be more effectively restrained from being damaged in the pressing step, and the close adhesiveness of each positive electrode plate to the strip-shaped negative electrode body after roller-pressing can be enhanced.

Another aspect of the present disclosure is a method for manufacturing a laminated electrode body in which a plurality of rectangular positive electrode plates and a plurality of rectangular negative electrode plates are alternately laminated with rectangular separators interposed therebetween, the method comprising: a strip-shaped laminated body production step of, producing the pressed strip-shaped laminated body; a cutting step of cutting the pressed strip-shaped laminated body to obtain rectangular plate-shaped unit laminated bodies in each of which the positive electrode plate, the separator, the negative electrode plate, and the separator are laminated in this order; and a laminating step of laminating the unit laminated bodies on each other to form the laminated electrode body.

In the above-described method for manufacturing the laminated electrode body, the pressed strip-shaped laminated body is produced in the strip-shaped laminated body production step as described above, and the pressed strip-shaped laminated body is cut in the cutting step to obtain unit laminated bodies. Accordingly, unit laminated bodies in each of which damage to the first outer ridge portion or the second outer ridge portion of the positive electrode plate and damage to the strip-shaped first separator are restrained can be obtained. By using the unit laminated bodies in the laminating step, a reliable laminated electrode body can be produced.

Another aspect of the present disclosure is a method for manufacturing a battery including a laminated electrode body in which a plurality of rectangular positive electrode plates and a plurality of rectangular negative electrode plates are alternately laminated with rectangular separators therebetween, the method comprising: an electrode body production step of producing the laminated electrode body; and an assembly step of assembling the battery by using the laminated electrode body:

In the above-described method for manufacturing the battery, the laminated electrode body is formed in the electrode body production step as described above, and thus a laminated electrode body in which damage to the first outer ridge portion or the second outer ridge portion of each positive electrode plate and damage to each strip-shaped first separator are restrained can be formed. By using the laminated electrode body in the assembly step, a reliable battery can be produced.

DETAILED DESCRIPTION OF THE EXEMPLARY EMBODIMENTS

Figure 1:
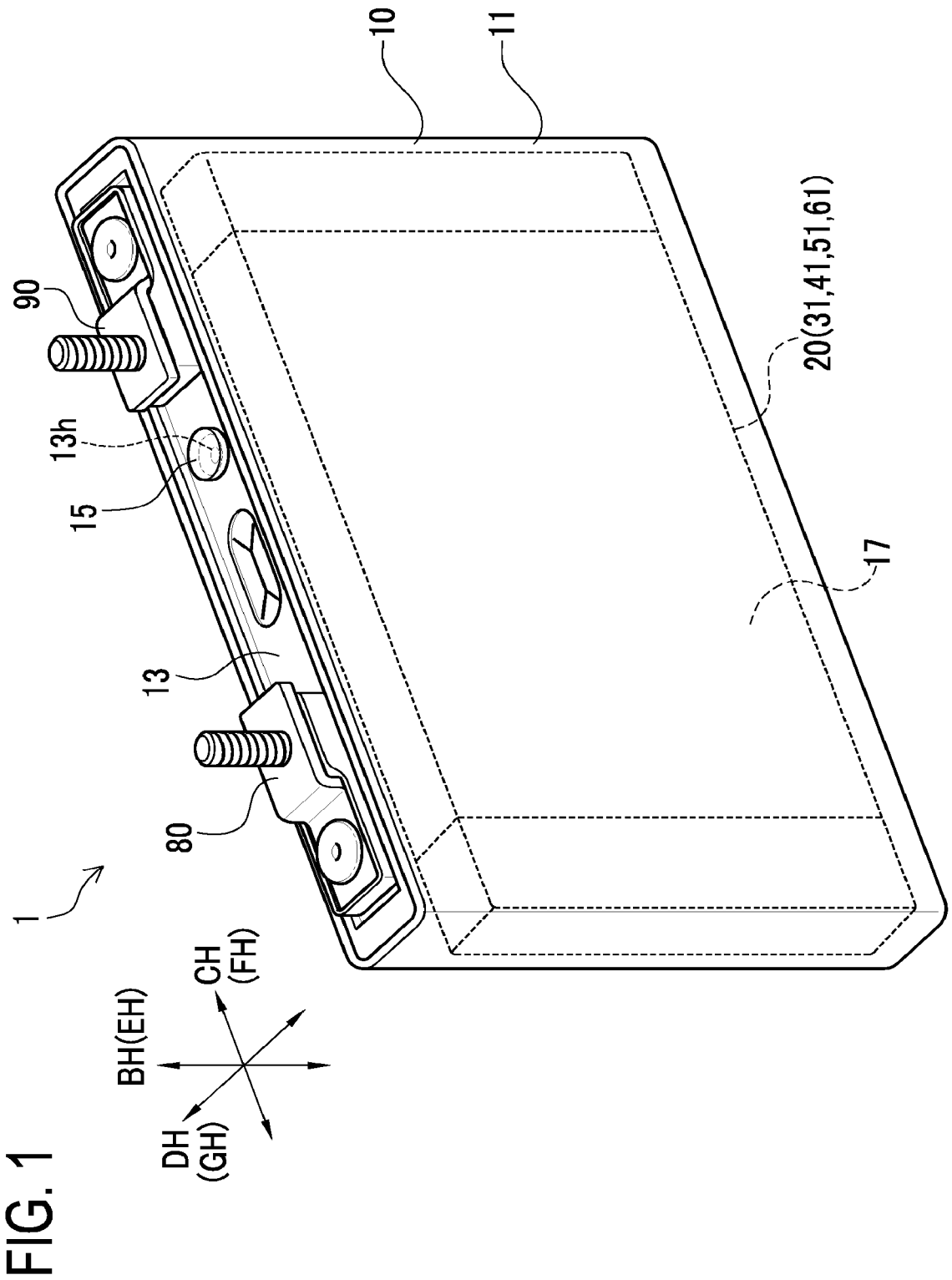
FIG. 1 is a perspective view of a battery according to an embodiment.

Hereinafter, an embodiment of the present disclosure will be described with reference to the drawings. FIG. 1 shows a perspective view of a battery 1 according to the present embodiment. For the following description, a battery short-side direction BH, a battery long-side direction CH, and a battery thickness direction DH of the battery 1 are defined as the directions indicated in FIG. 1. The battery 1 is a rectangular sealed lithium ion secondary battery that is installed in a vehicle such as a hybrid car, a plug-in hybrid car, or an electric vehicle. The battery 1 includes a rectangular battery case 10, a laminated electrode body 20 and an electrolyte 17 housed inside the battery case 10, and a positive electrode terminal member 80 and a negative electrode terminal member 90 supported on the battery case 10.

The battery case 10 has a rectangular parallelepiped shape and is made of a metal (aluminum in the present embodiment). The battery case 10 includes a bottomed rectangular tubular case body member 11 that is open only at the top, and a rectangular plate-shaped case lid member 13 that is welded so as to close the opening of the case body member 11. The positive electrode terminal member 80 made of aluminum is fixed to the case lid member 13 so as to be insulated from the case lid member 13. The positive electrode terminal member 80 is connected and conducted to positive electrode plates 31 of the laminated electrode body 20 inside the battery case 10, while extending through the case lid member 13 to the outside of the battery. In addition, the negative electrode terminal member 90 made of copper is fixed to the case lid member 13 so as to be insulated from the case lid member 13. The negative electrode terminal member 90 is connected and conducted to negative electrode plates 41 of the laminated electrode body 20 inside the battery case 10, while extending through the case lid member 13 to the outside of the battery.

Figure 2:
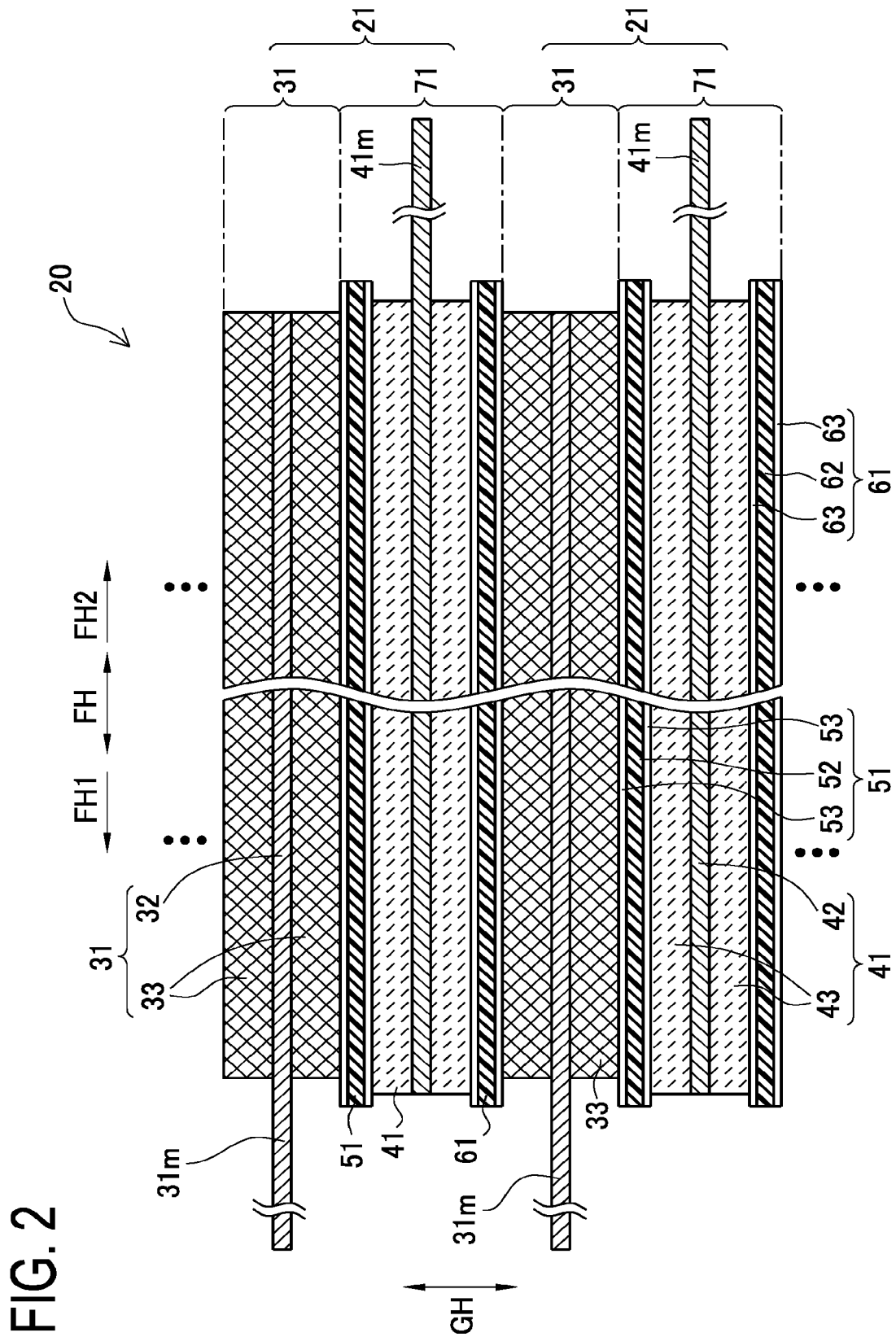
FIG. 2 is a cross-sectional view of a laminated electrode body according to the embodiment.
Figure 3:
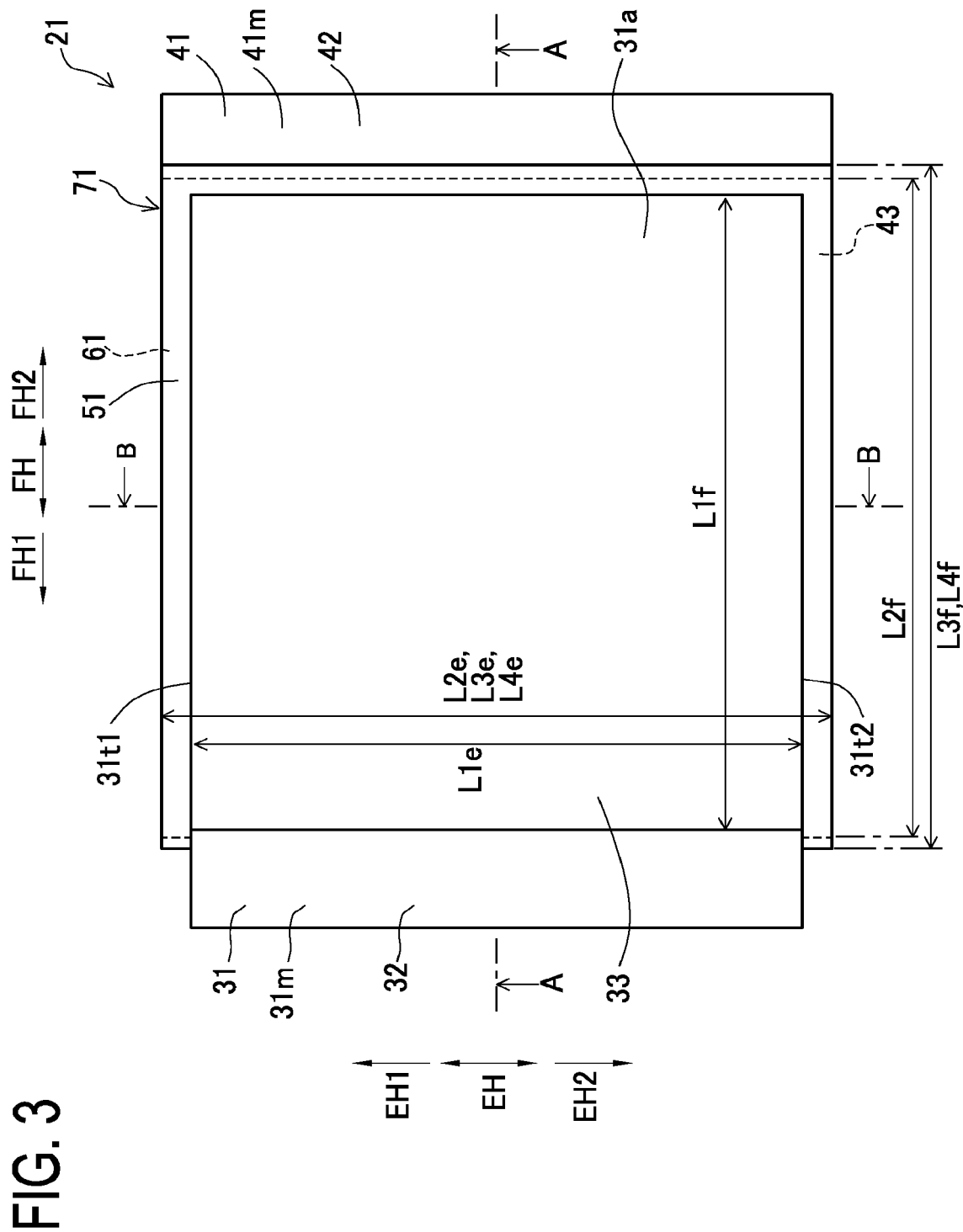
FIG. 3 is a plan view of a unit laminated body according to the embodiment.
Figure 4:
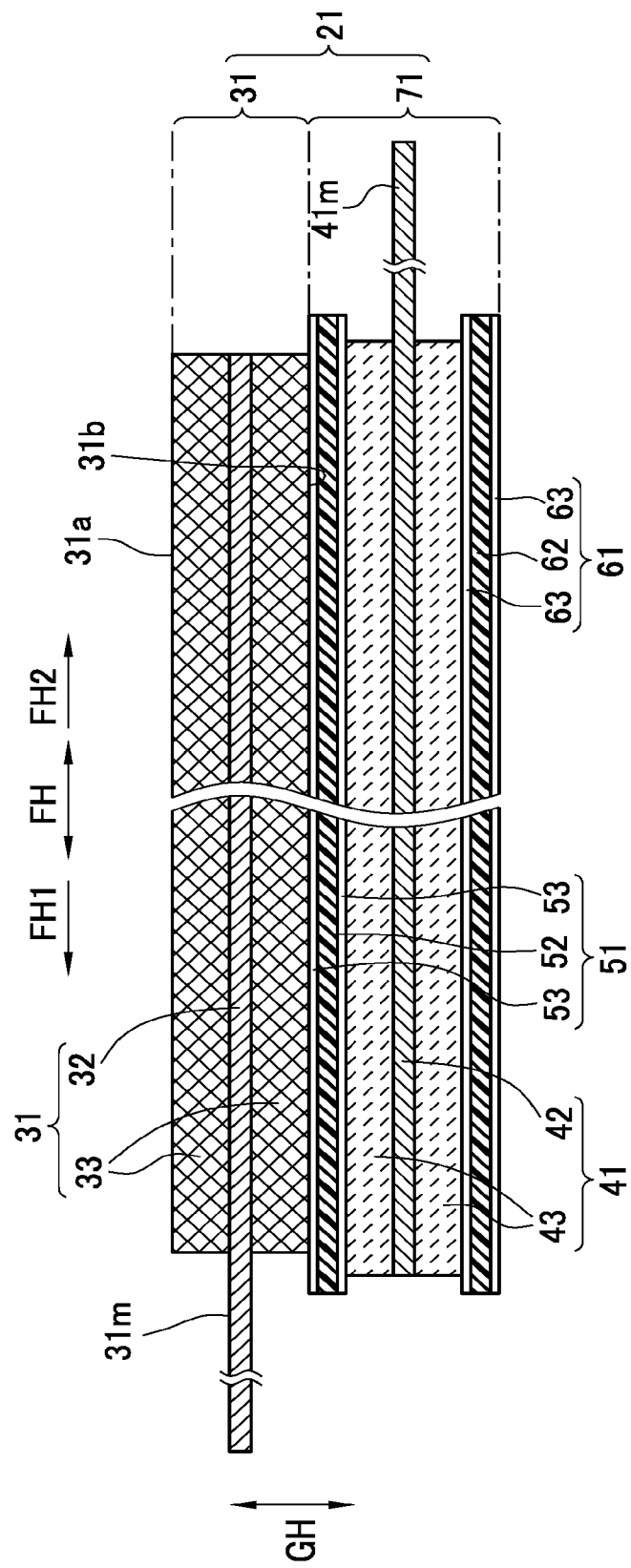
FIG. 4 is a cross-sectional view of the unit laminated body according to the embodiment taken along a line A-A in FIG. 3.
Figure 5:
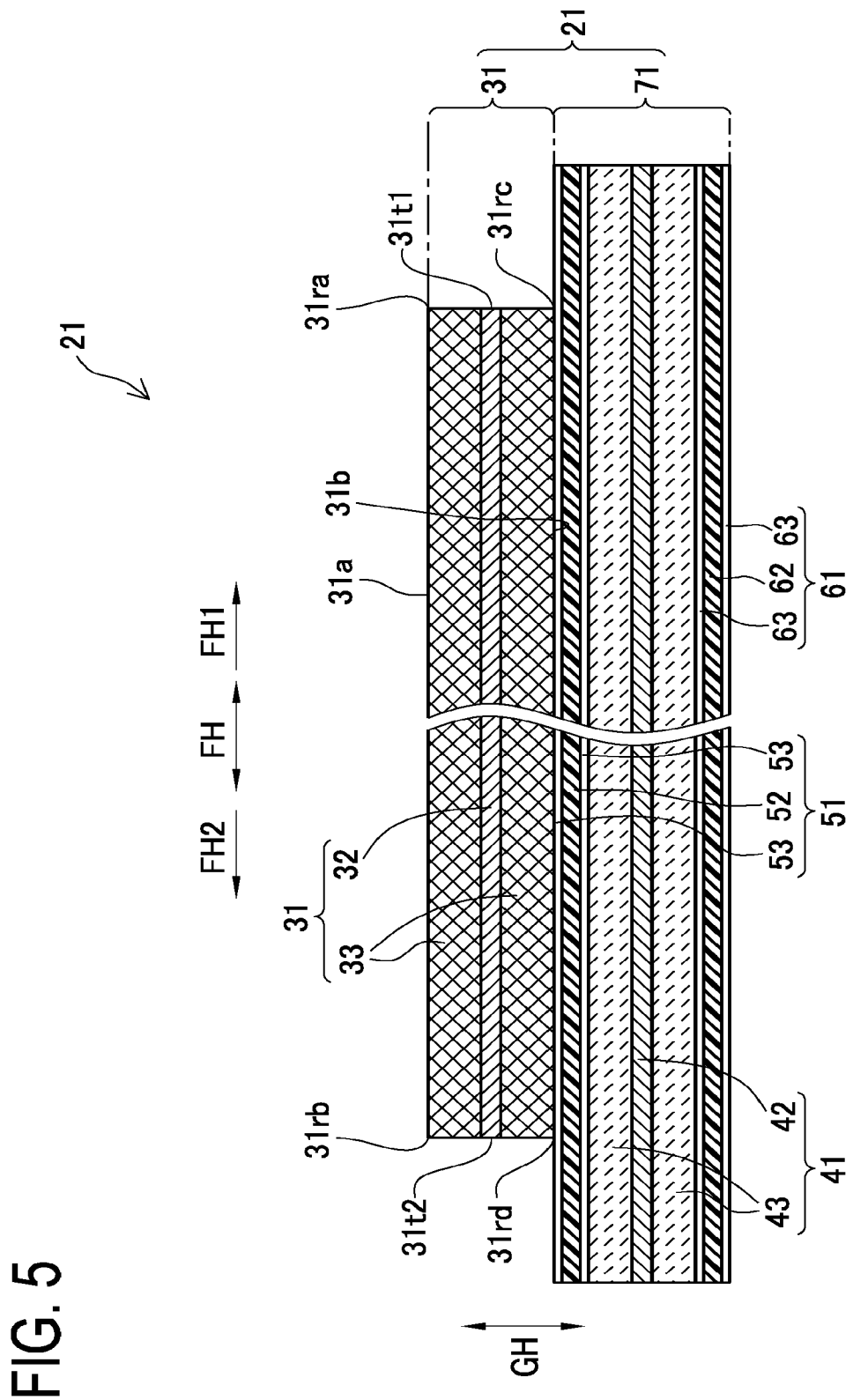
FIG. 5 is a cross-sectional view of the unit laminated body according to the embodiment taken along a line B-B in FIG. 3.
Figure 6:
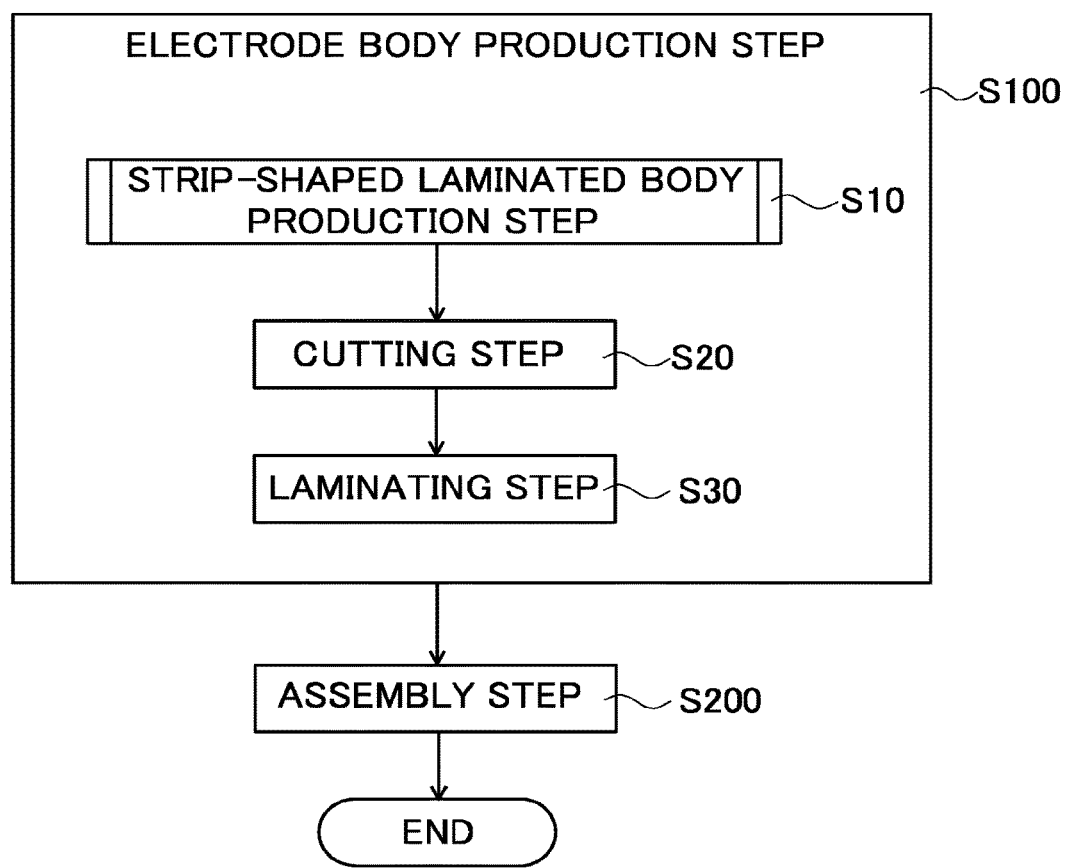
FIG. 6 is a flowchart of a method for manufacturing the battery according to the embodiment.
Figure 7:
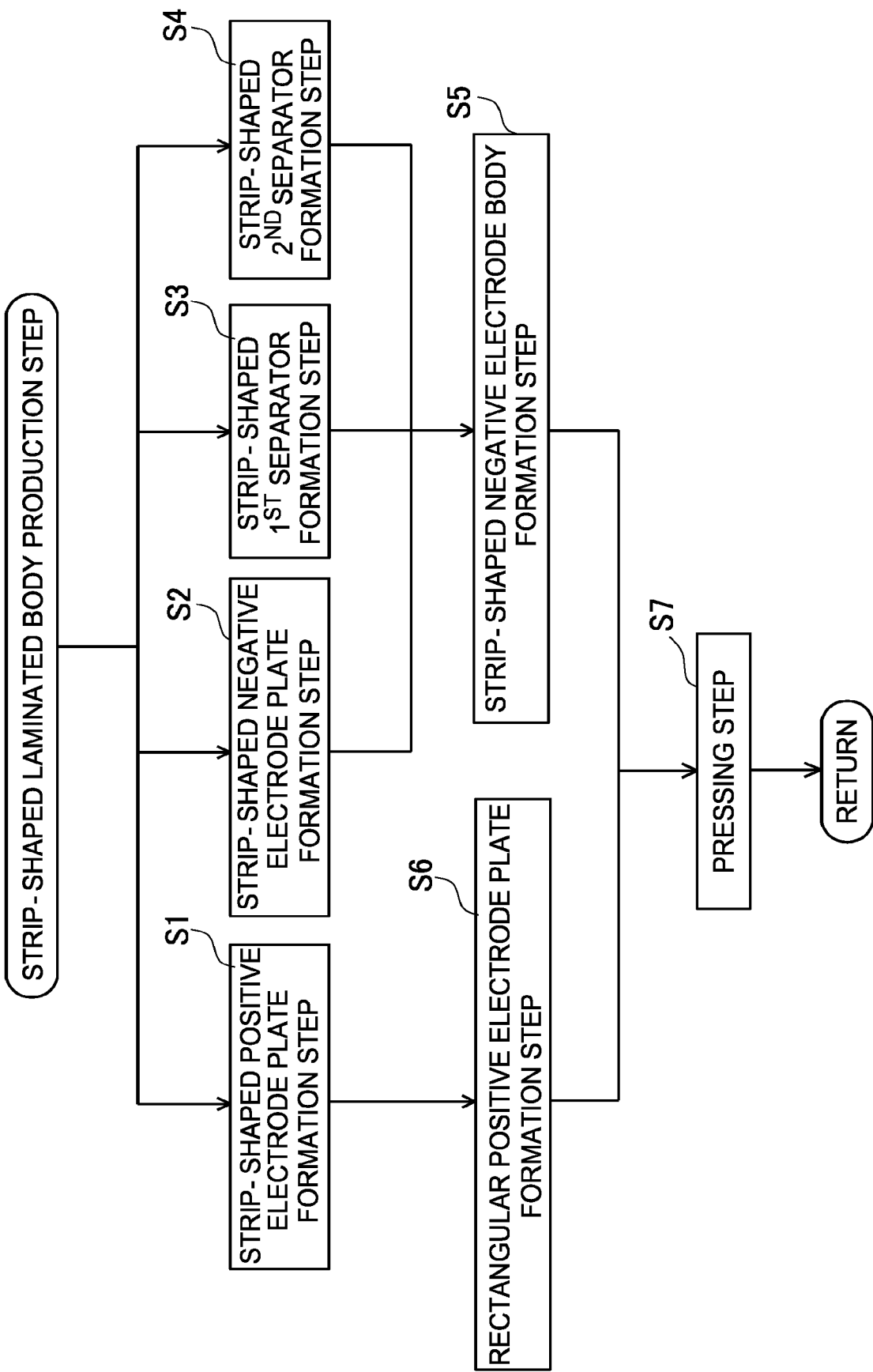
FIG. 7 is a flowchart of strip-shaped laminated body production process subroutines according to the embodiment.
Figure 8:
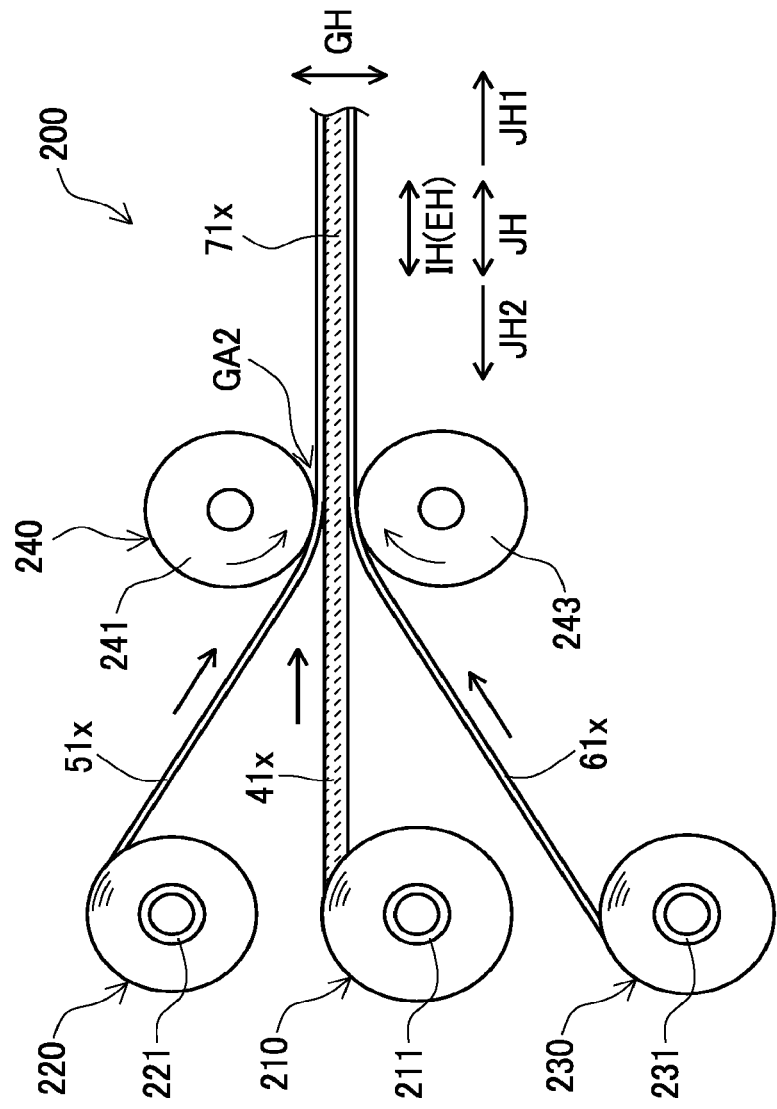
FIG. 8 illustrates a state of forming a strip-shaped negative electrode body according to the embodiment.
Figure 9:
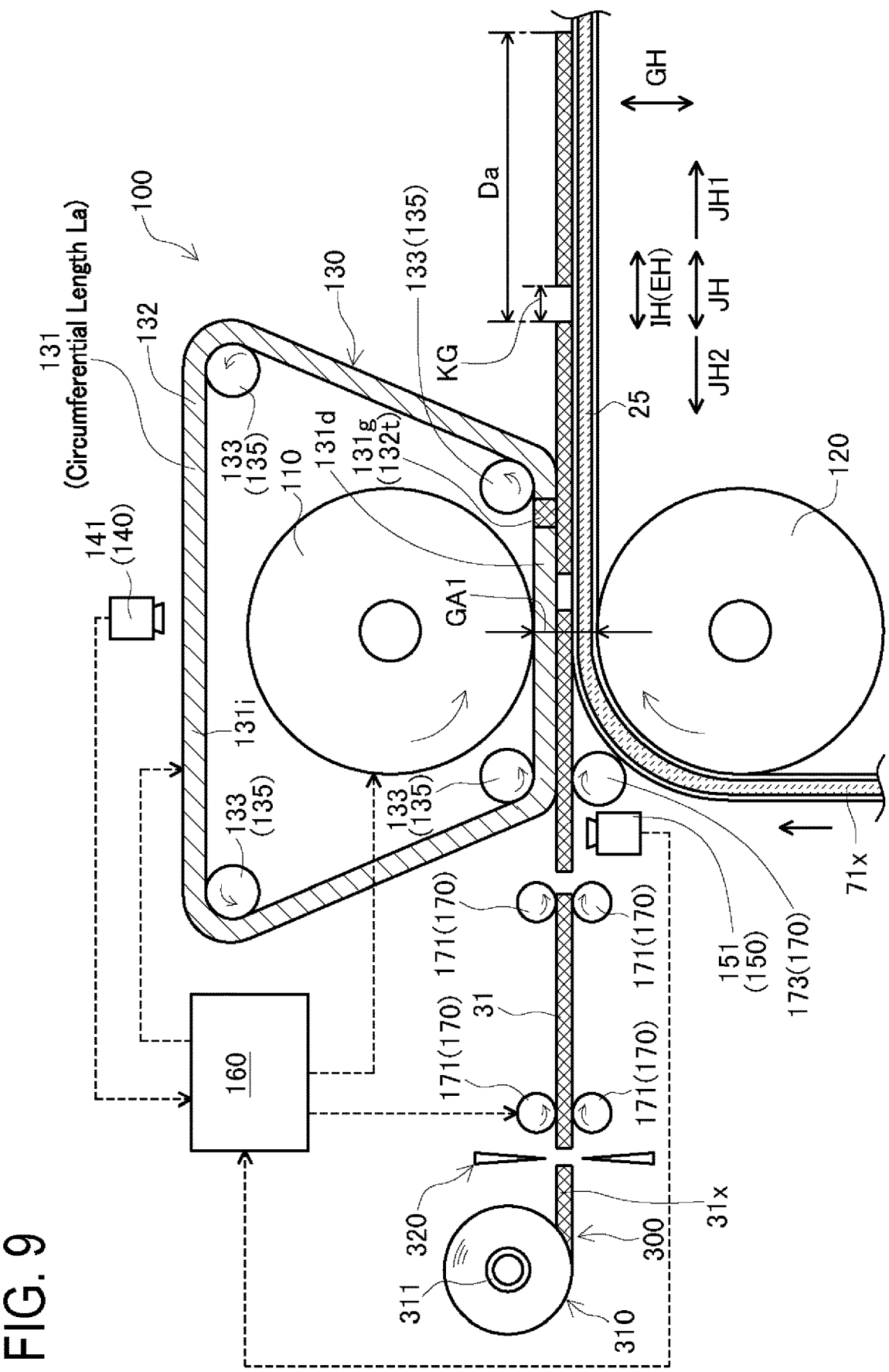
FIG. 9 illustrates a state of forming a pressed strip-shaped laminated body according to the embodiment.
Figure 10:
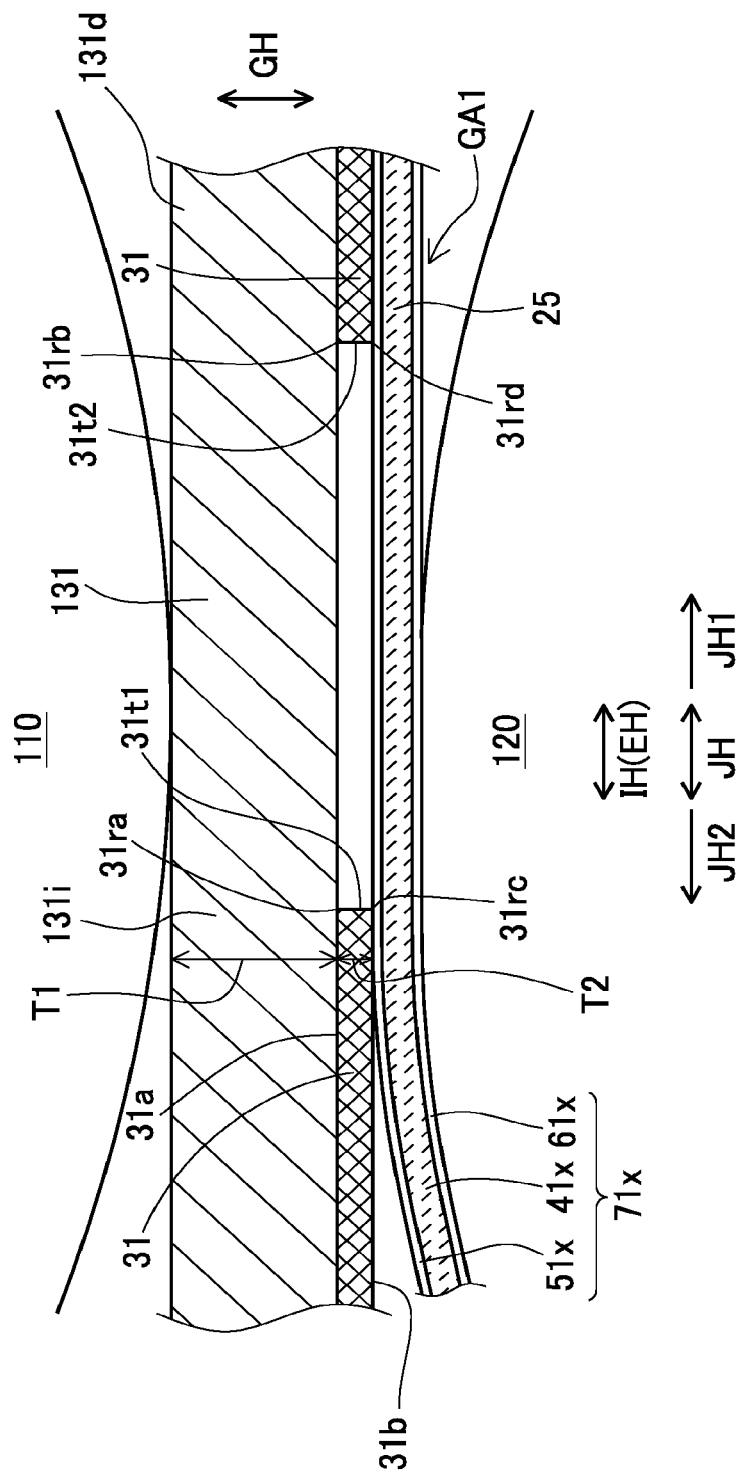
FIG. 10 illustrates an area around a roller gap in FIG. 9 according to the embodiment.
Figure 11:
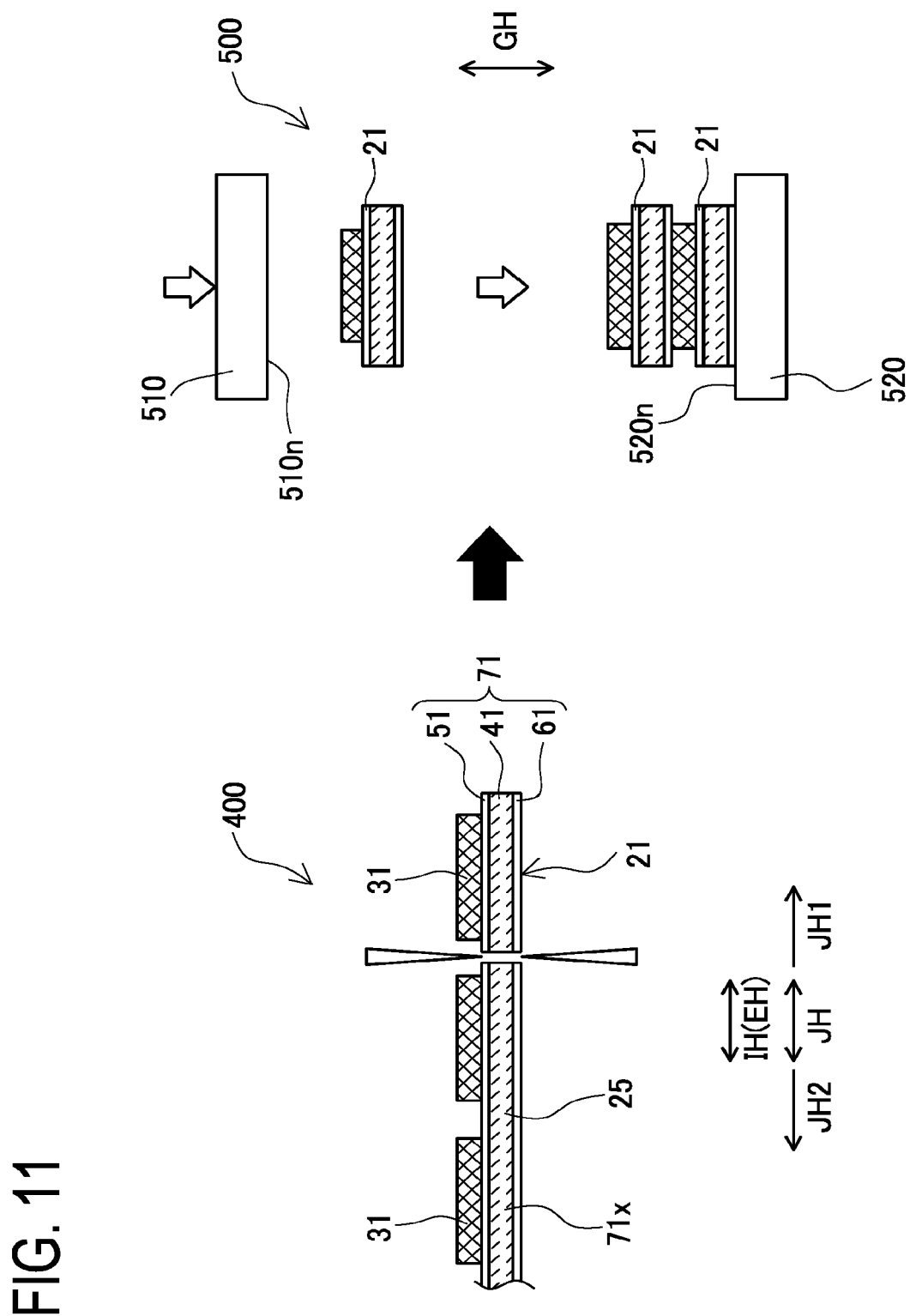
FIG. 11 illustrates a state of forming unit laminated bodies and further forming the laminated electrode body according to the embodiment.

Next, the laminated electrode body 20 will be described. FIG. 2 shows a cross-sectional view of the laminated electrode body 20, and FIG. 3 to FIG. 5 show a plan view and cross-sectional views of a unit laminated body 21 constituting the laminated electrode body 20. For the following description, a short-side direction EH, a long-side direction FH, and a laminating direction GH of the laminated electrode body 20 and unit laminated bodies 21 are defined as the directions indicated in FIG. 2 to FIG. 4. The laminated electrode body 20 has a rectangular parallelepiped shape and is formed by laminating and integrating a plurality of rectangular plate-shaped unit laminated bodies 21 in the laminating direction GH. Each unit laminated body 21 is obtained by cutting a pressed strip-shaped laminated body 25 described later and includes the rectangular positive electrode plate 31 and a rectangular plate-shaped negative electrode body 71 having the rectangular negative electrode plate 41 disposed between a pair of rectangular separators (a first separator 51 and a second separator 61). The positive electrode plate 31, the first separator 51, the negative electrode plate 41, and the second separator 61 are laminated in this order.

The positive electrode plate 31 has a positive current collector foil 32 composed of a rectangular aluminum foil, and positive active material layers 33 that are formed on both principal surfaces of the positive current collector foil 32, respectively, and that contain positive active material particles, conductive particles, and a binder. In the present embodiment, lithium ion transition metal complex oxide particles, specifically, lithium nickel cobalt manganese oxide particles, are used as the positive active material particle, acetylene black (AB) particles are used as the conductive particles, and polyvinylidene fluoride (PVDF) is used as the binder.

In the positive electrode plate 31, at one side portion extending in the short-side direction EH (the direction orthogonal to the sheet in FIG. 2 and FIG. 4, the up-down direction in FIG. 3, and the right-left direction in FIG. 5) at one side FH1 (the left side in FIG. 2 to FIG. 4) in the long-side direction FH (the right-left direction in FIG. 2 to FIG. 4, the direction orthogonal to the sheet in FIG. 5), the positive active material layers 33 are not present in the laminating direction GH (the up-down direction in FIG. 2, FIG. 4, and FIG. 5, the direction orthogonal to the sheet in FIG. 3), and the positive current collector foil 32 forms a positive current collector portion 31$m$ exposed in the laminating direction GH. The positive current collector portions 31$m$ of the respective positive electrode plates 31 forming the laminated electrode body 20 are laminated in the laminating direction GH and connected (welded) to the above-described positive electrode terminal member 80.

The positive electrode plate 31 has a pair of positive electrode plate end surfaces facing in the short-side direction EH, that is, a first positive electrode plate end surface 31$t$1 located at one side EH1 (the upper side in FIG. 3, the right side in FIG. 5) in the short-side direction EH and a second positive electrode plate end surface 31$t$2 located at another side EH2 (the lower side in FIG. 3, the left side in FIG. 5) in the short-side direction EH. In addition, a first outer ridge portion 31$ra$ extending in the long-side direction FH is formed by one first positive electrode plate principal surface 31$a$ of the positive electrode plate 31 and the first positive electrode plate end surface 31$t$1, and a second outer ridge portion 31$rb$ extending in the long-side direction FH is formed by the first positive electrode plate principal surface 31$a$ and the second positive electrode plate end surface 31$t$2. Moreover, a first inner ridge portion 31$rc$ extending in the long-side direction FH is formed by another second positive electrode plate principal surface 31$b$ of the positive electrode plate 31 and the first positive electrode plate end surface 31$t$1, and a second inner ridge portion 31$rd$ extending in the long-side direction FH is formed by the second positive electrode plate principal surface 31$b$ and the second positive electrode plate end surface 31$t$2.

The negative electrode plate 41 has a negative current collector foil 42 composed of a rectangular copper foil, and negative active material layers 43 that are formed on both principal surfaces of the negative current collector foil 42, respectively, and that contain negative active material particles, a binder, and a thickener. In the present embodiment, graphite particles are used as the negative active material particles, styrene butadiene rubber (SBR) is used as the binder, and carboxymethyl cellulose (CMC) is used as the thickener.

A dimension L2$e$ (see FIG. 3) in the short-side direction EH of the negative electrode plate 41 and the negative active material layers 43 is larger than a dimension L1$e$ in the short-side direction EH of the positive electrode plate 31 and the positive active material layers 33, and a dimension L2$f$ in the long-side direction FH of the negative active material layers 43 is larger than a dimension L1$f$ in the long-side direction FH of the positive active material layers 33. In the negative electrode plate 41, at another side portion extending in the short-side direction EH at another side FH2 (the right side in FIG. 2 to FIG. 4) in the long-side direction FH, the negative active material layers 43 are not present in the laminating direction GH, and the negative current collector foil 42 forms a negative current collector portion 41$m$ exposed in the laminating direction GH. The negative current collector portions 41$m$ of the respective negative electrode plates 41 forming the laminated electrode body 20 are laminated in the laminating direction GH and connected (welded) to the above-described negative electrode terminal member 90.

The first separator 51 is interposed between the positive electrode plate 31 and the negative electrode plate 41 so as to closely adhere to the positive electrode plate 31 and the negative electrode plate 41 in such a manner as to cover the entirety of the positive active material layer 33 of the positive electrode plate 31 and the entirety of the negative active material layer 43 of the negative electrode plate 41. The first separator 51 includes a separator body 52 that is composed of a rectangular porous resin film, and porous adhesion layers 53 formed over the entireties of both principal surfaces of the separator body 52, respectively, and containing a binder. A dimension L3$e$ (see FIG. 3) in the short-side direction EH of the first separator 51 is equal to the dimension L2$e$ in the short-side direction EH of the negative electrode plate 41 and the negative active material layers 43, whereas a dimension L3$f$ in the long-side direction FH of the first separator 51 is larger than the dimension L2$f$ in the long-side direction FH of the negative active material layers 43.

In a state where the laminated electrode body 20 is formed, the second separator 61 is also interposed between the positive electrode plate 31 and the negative electrode plate 41 so as to closely adhere to the positive electrode plate 31 and the negative electrode plate 41 in such a manner as to cover the entirety of the positive active material layer 33 of the positive electrode plate 31 and the entirety of the negative active material layer 43 of the negative electrode plate 41. The second separator 61 also includes a separator body 62 composed of a rectangular plate-shaped porous resin film and porous adhesion layers 63 formed over the entireties of both principal surfaces of the separator body 62, respectively and containing a binder. Dimensions L4e and L4f (see FIG. 3) in the short-side direction EH and the long-side direction FH of the second separator 61 are equal to the dimensions L3e and L3f in the short-side direction EH and the long-side direction FH of the first separator 51, respectively. In addition, the dimension L4e in the short-side direction EH of the second separator 61 is equal to the dimension L2e in the short-side direction EH of the negative electrode plate 41 and the negative active material layers 43, whereas the dimension L4f in the long-side direction FH of the second separator 61 is larger than the dimension L2f in the long-side direction FH of the negative active material layers 43.

Next, a method for manufacturing the battery 1 will be described (see FIG. 6 to FIG. 11). The battery 1 is produced by sequentially performing a "strip-shaped laminated body production step S10", a "cutting step S20", and a "laminating step S30" to form the laminated electrode body 20 in an "electrode body production step S100", and then assembling the battery 1 using the laminated electrode body 20 in an "assembly step S200" (see FIGS. 6 and 7).

In the strip-shaped laminated body production step S10, first, in a "strip-shaped positive electrode plate formation step S1" (see FIG. 7), a strip-shaped positive electrode plate 31x that is to be cut into the rectangular positive electrode plates 31 is formed. Specifically, the positive current collector foil 32 made of a strip-shaped aluminum foil is prepared, and the strip-shaped positive active material layers 33 containing the positive active material particles (lithium nickel cobalt manganese oxide particles in the present embodiment), the conductive particles (AB particles in the present embodiment), and the binder (PVDF in the present embodiment) are formed on both principal surfaces of the positive current collector foil 32, respectively.

In the present embodiment, the positive active material particles, the conductive particles, the binder, and a dispersion medium are mixed and granulated by using an agitation-type mixer and granulator (not shown) capable of mixing and granulating materials, thereby obtaining a particle aggregate composed of wet particles having a particle diameter of about 1 to 2 mm. Meanwhile, a roller-press apparatus (not shown) including three press rollers (a press roller A, a press roller B disposed parallel to the press roller A, and a press roller C disposed parallel to the press roller B) is prepared. Then, the above-described particle aggregate is rolled through a roller gap between the press roller A and the press roller B to form an undried active material film on the press roller B. Subsequently, the undried active material film on the press roller B is transferred onto the positive current collector foil 32 having passed through a roller gap between the press roller B and the press roller C. Then, the undried active material film on the positive current collector foil 32 is dried to form the positive active material layer 33. Then, an undried active material film is also similarly formed on the opposite principal surface of the positive current collector foil 32 by using this roller-press apparatus, and is dried to form the positive active material layer 33. Subsequently, the strip-shaped positive electrode plate is roller-pressed by using a roller-press apparatus (not shown) to increase the density of the positive active material layers 33. Thus, the strip-shaped positive electrode plate 31x is formed.

Separately, in a "strip-shaped negative electrode plate formation step S2" (see FIG. 7), a strip-shaped negative electrode plate 41x that is to be cut into the rectangular negative electrode plates 41 is formed. Specifically, the negative current collector foil 42 composed of a strip-shaped copper foil is prepared, and the strip-shaped negative active material layers 43 containing the negative active material particles (graphite particles in the present embodiment), the binder (SBR in the present embodiment), and the thickener (CMC in the present embodiment) are formed on both principal surfaces of the negative current collector foil 42, respectively.

In the present embodiment, the negative active material particles, the binder, the thickener, and a dispersion medium are mixed and granulated by using the above-described agitation-type mixer granulator, thereby obtaining a particle aggregate composed of wet particles having a particle diameter of about 1 to 2 mm. Meanwhile, the above-described roller-press apparatus is prepared. Then, the above-described particle aggregate is rolled through the roller gap between the press roller A and the press roller B to form an undried active material film on the press roller B. Subsequently, the undried active material film on the press roller B is transferred onto the negative current collector foil 42 having passed through the roller gap between the press roller B and the press roller C. Then, the undried active material film on the negative current collector foil 42 is dried to form the negative active material layer 43. Then, an undried active material film is also similarly formed on the opposite principal surface of the negative current collector foil 42 by using the roller-press apparatus, and is dried to form the negative active material layer 43. Subsequently, the strip-shaped negative electrode plate is roller-pressed by using the roller-press apparatus (not shown) to increase the density of the negative active material layers 43. Thus, the strip-shaped negative electrode plate 41x is formed.

Separately, in a "strip-shaped first separator formation step S3" (see FIG. 7), a strip-shaped first separator 51x that is to be cut into the rectangular first separators 51 is formed. Specifically, the strip-shaped separator body 52 composed of a porous resin film is prepared, and a dispersion liquid obtained by dispersing polyethylene particles and a binder in a dispersion medium is applied to one principal surface of the separator body 52 and heated and dried to form the adhesion layer 53. In addition, the dispersion liquid is similarly applied to the opposite principal surface of the separator body 52 and heated and dried to form the adhesion layer 53. Thus, the strip-shaped first separator 51x is formed.

Separately, in a "strip-shaped second separator formation step S4" (see FIG. 7), a strip-shaped second separator 61x that is to be cut into the rectangular second separators 61 is formed. Specifically, similar to the strip-shaped first separator formation step S3, the above-described dispersion liquid is applied to one principal surface of the separator body 62 and heated and dried to form the adhesion layer 63. In addition, the above-described dispersion liquid is similarly applied to the opposite principal surface of the separator body 62 and heated and dried to form the adhesion layer 63. Thus, the strip-shaped second separator 61x is formed.

Next, a "strip-shaped negative electrode body formation step S5" (see FIG. 7) is performed by using a strip-shaped negative electrode body production apparatus 200 (see FIG. 8), to form a strip-shaped negative electrode body 71x. The strip-shaped negative electrode body production apparatus 200 includes a negative electrode plate feeding unit 210, a first separator feeding unit 220, a second separator feeding unit 230, and a first roller-pressing unit 240.

The strip-shaped negative electrode plate 41x wound on an unwinding roll 211 is mounted on the negative electrode plate feeding unit 210, and the strip-shaped negative electrode plate 41x is fed in a longitudinal direction IH from the negative electrode plate feeding unit 210.

The first separator feeding unit 220 is disposed above the negative electrode plate feeding unit 210. The strip-shaped first separator 51x wound on an unwinding roll 221 is mounted on the first separator feeding unit 220, and the strip-shaped first separator 51x is fed in the longitudinal direction IH from the first separator feeding unit 220.

The second separator feeding unit 230 is disposed below the negative electrode plate feeding unit 210. The strip-shaped second separator 61x wound on an unwinding roll 231 is mounted on the second separator feeding unit 230, and the strip-shaped second separator 61x is fed in the longitudinal direction IH from the second separator feeding unit 230.

The first roller-pressing unit 240 has a third press roller 241 and a fourth press roller 243 disposed parallel to the third press roller 241. In a roller gap GA2 between the third press roller 241 and the fourth press roller 243, the strip-shaped first separator 51x, the strip-shaped negative electrode plate 41x, and the strip-shaped second separator 61x are laminated in this order and roller-pressed to be closely adhered to each other, thereby forming the strip-shaped negative electrode body 71x.

In the strip-shaped negative electrode body formation step S5, the strip-shaped negative electrode plate 41x transferred from the negative electrode plate feeding unit 210, the strip-shaped first separator 51x transferred from the first separator feeding unit 220, and the strip-shaped second separator 61x transferred from the second separator feeding unit 230 move toward the first roller-pressing unit 240. Then, in the roller gap GA2 between the third press roller 241 and the fourth press roller 243 of the first roller-pressing unit 240, in a state where the strip-shaped negative electrode plate 41x is laminated between the strip-shaped first separator 51x and the strip-shaped second separator 61x, the strip-shaped first separator 51x, the strip-shaped negative electrode plate 41x, and the strip-shaped second separator 61x are roller-pressed to be closely adhered to each other, thereby forming the strip-shaped negative electrode body 71x.

In parallel with the strip-shaped negative electrode body formation step S5, a "rectangular positive electrode plate formation step S6" (see FIG. 7) is performed by using a rectangular positive electrode plate production apparatus 300 (see FIG. 9), to form the rectangular positive electrode plate 31.

The rectangular positive electrode plate production apparatus 300 includes a positive electrode plate feeding unit 310 and a positive electrode plate cutting unit 320. The strip-shaped positive electrode plate 31x wound on an unwinding roll 311 is mounted on the positive electrode plate feeding unit 310, and the strip-shaped positive electrode plate 31x is fed in the longitudinal direction IH from the positive electrode plate feeding unit 310.

The positive electrode plate cutting unit 320 is disposed at a downstream side JH1 of the positive electrode plate feeding unit 310. The positive electrode plate cutting unit 320 is configured to cut the strip-shaped positive electrode plate 31x at predetermined intervals (intervals each equal to the dimension L1e (see FIG. 3) in the short-side direction EH of the positive electrode plate 31) in the longitudinal direction IH to form the rectangular positive electrode plates 31.

In the rectangular positive electrode plate formation step S6, the strip-shaped positive electrode plate 31x transferred from the positive electrode plate feeding unit 310 is cut at the above-described predetermined intervals in the longitudinal direction IH by the positive electrode plate cutting unit 320 to form the rectangular positive electrode plates 31.

In each positive electrode plate 31, the positive electrode plate end surface facing the downstream side JH1 in a conveyance direction JH is the above-described first positive electrode plate end surface 31t1 (see FIG. 10 and FIG. 5), and the positive electrode plate end surface facing an upstream side JH2 in the conveyance direction JH is the above-described second positive electrode plate end surface 31t2. In addition, in each positive electrode plate 31, a ridge portion formed by the upward-facing first positive electrode plate principal surface 31a and the first positive electrode plate end surface 31t1 is the above-described first outer ridge portion 31ra, and a ridge portion formed by the first positive electrode plate principal surface 31a and the second positive electrode plate end surface 31t2 is the above-described second outer ridge portion 31rb. Moreover, in each positive electrode plate 31, a ridge portion formed by the downward-facing second positive electrode plate principal surface 31b and the first positive electrode plate end surface 31t1 is the above-described first inner ridge portion 31rc, and a ridge portion formed by the second positive electrode plate principal surface 31b and the second positive electrode plate end surface 31t2 is the second inner ridge portion 31rd.

Next, a "pressing step S7" (see FIG. 7) is performed by using a laminated body pressing apparatus 100 (see FIG. 9 and FIG. 10) to form the pressed strip-shaped laminated body 25. The laminated body pressing apparatus 100 is installed at the downstream side JH1 of the strip-shaped negative electrode body production apparatus 200 and at the downstream side JH1 of the rectangular positive electrode plate production apparatus 300. The laminated body pressing apparatus 100 includes a first press roller 110, a second press roller 120 disposed parallel to the first press roller 110, a metal plate feeding unit 130 that feeds an endless strip-shaped metal plate (strip-shaped metal plate) 131, a joined-portion detection unit 140, a positive electrode plate detection unit 150, a control unit 160, and a feeding unit 170.

In the laminated body pressing apparatus 100, in a roller gap GA1 between the first press roller 110 and the second press roller 120, in a state where the positive electrode plate 31 fed from the feeding unit 170 is placed on the strip-shaped negative electrode body 71x, and the endless strip-shaped metal plate 131 fed from the metal plate feeding unit 130 is placed on the positive electrode plate 31, the endless strip-shaped metal plate 131, the positive electrode plate 31, and the strip-shaped negative electrode body 71x are roller-pressed to form the pressed strip-shaped laminated body 25.

The first press roller 110 and the second press roller 120 each has a roller surface made of stainless steel and each has a roller diameter (diameter) of 100 mm.

The metal plate feeding unit 130 is configured to feed the endless strip-shaped metal plate 131 extending in the conveyance direction JH, between the first press roller 110 and the positive electrode plate 31 in the roller gap GA1 between the first press roller 110 and the second press roller 120.

The endless strip-shaped metal plate 131 has an annular shape and has a joined portion 131g at which both end portions 132t of a strip-shaped metal plate (specifically, a copper plate) 132 are stacked and joined to each other. A circumferential length La of the endless strip-shaped metal plate 131 is a length that is an integer multiple (20 times in the present embodiment) of a predetermined interval Da between the positive electrode plates 31 placed on the strip-shaped negative electrode body 71x. A thickness T1 (T1=500 µm in the present embodiment) (see FIG. 10) of the endless strip-shaped metal plate 131 is three to eight times (five times in the present embodiment) a thickness T2 (T2=100 µm in the present embodiment) of the positive electrode plate 31.

The metal plate feeding unit 130 has a plurality of transfer rollers 133 at each of the downstream side JH1 and the upstream side JH2 of the first press roller 110, and a circulation path 135 through which the endless strip-shaped metal plate 131 circulates is formed by these transfer rollers 133. Specifically, the endless strip-shaped metal plate 131 is extended over the respective transfer rollers 133, and the circulation path 135 is formed such that a downstream portion 131d, of the endless strip-shaped metal plate 131, transferred to the downstream side JH1 of the roller gap GAL is moved through above the first press roller 110 and returned to the upstream side JH2 of the roller gap GA1.

The joined-portion detection unit 140 has a camera 141 above the above-described circulation path 135, and the camera 141 captures an image of the endless strip-shaped metal plate 131 being transferred. The joined-portion detection unit 140 is configured to detect the position of the joined portion 131g of the endless strip-shaped metal plate 131 on the basis of the image of the endless strip-shaped metal plate 131 captured by the camera 141. In addition, the joined-portion detection unit 140 is connected to the control unit 160 and configured to be able to output positional information of the joined portion 131g of the endless strip-shaped metal plate 131 detected by the joined-portion detection unit 140, to the control unit 160.

The positive electrode plate detection unit 150 has a camera 151 at the upstream side JH2 with respect to the roller gap GA1 between the first press roller 110 and the second press roller 120, and the camera 151 captures an image of each positive electrode plate 31. The positive electrode plate detection unit 150 is configured to detect the position of each positive electrode plate 31 to be roller-pressed on the basis of the image of each positive electrode plate 31 captured by the camera 151. In addition, the positive electrode plate detection unit 150 is connected to the control unit 160 and configured to output positional information of each positive electrode plate 31 detected by the positive electrode plate detection unit 150 to the control unit 160.

The feeding unit 170 is provided at the downstream side JH1 of the rectangular positive electrode plate production apparatus 300 and at the upstream side JH2 of the roller gap GA1 between the first press roller 110 and the second press roller 120. The feeding unit 170 has a plurality of first transfer rollers 171 and transfers each positive electrode plate 31 formed through cutting by the rectangular positive electrode plate production apparatus 300 toward the roller gap GA1 while nipping the positive electrode plate 31 between the first transfer rollers 171.

The feeding unit 170 also has a second transfer roller 173 at the downstream side JH1 with respect to the first transfer rollers 171. The second transfer roller 173 is paired with one of the transfer rollers 133 constituting the circulation path 135 of the metal plate feeding unit 130, and nips and transfers the positive electrode plate 31 together with the endless strip-shaped metal plate 131 toward the roller gap GA1.

The control unit 160 has a microcomputer that includes a CPU, a ROM, and a RAM which are not shown and that operates by a predetermined control program stored in the ROM or the like. The control unit 160 controls transfer of each positive electrode plate 31 by the feeding unit 170. In addition, the control unit 160 controls transfer of the endless strip-shaped metal plate 131, each positive electrode plate 31, and the strip-shaped negative electrode body 71x by the first press roller 110 and the second press roller 120 and feed of the endless strip-shaped metal plate 131 by the metal plate feeding unit 130, on the basis of the positional information of the joined portion 131g of the endless strip-shaped metal plate 131 inputted from the joined-portion detection unit 140 and the positional information of each positive electrode plate 31 to be roller-pressed which is inputted from the positive electrode plate detection unit 150.

Specifically, the control unit 160 is connected to motors (not shown) for rotating the first transfer rollers 171 of the feeding unit 170, and controls transfer of each positive electrode plate 31 by the feeding unit 170 by controlling these motors. More specifically, the control unit 160 controls transfer of each positive electrode plate 31 by the feeding unit 170 such that the respective positive electrode plates 31 are placed on the strip-shaped negative electrode body 71x at the predetermined intervals Da so as to be spaced apart from each other by a gap KG in the longitudinal direction IH.

The control unit 160 is also connected to motors (not shown) for rotating the first press roller 110 and the second press roller 120, and controls transfer of the endless strip-shaped metal plate 131, each positive electrode plate 31, and the strip-shaped negative electrode body 71x by the first press roller 110 and the second press roller 120, by controlling these motors. Moreover, the control unit 160 is connected to motors (not shown) for rotating the transfer rollers 133 for the circulation path 135 of the metal plate feeding unit 130, and controls feed of the endless strip-shaped metal plate 131 by the metal plate feeding unit 130 by controlling these motors. More specifically, the control unit 160 controls transfer of the endless strip-shaped metal plate 131, each positive electrode plate 31, and the strip-shaped negative electrode body 71x by the first press roller 110 and the second press roller 120 and feed of the endless strip-shaped metal plate 131 by the metal plate feeding unit 130 such that a non-joined portion 131i of the endless strip-shaped metal plate 131 other than the joined portion 131g is placed on the first outer ridge portion 31ra and the second outer ridge portion 31rb of the positive electrode plate 31 (the joined portion 131g is not placed thereon).

Next, the pressing step S7 will be described. In the pressing step S7, the rectangular positive electrode plate 31 formed by the rectangular positive electrode plate production apparatus 300 moves toward the roller gap GA1 between the first press roller 110 and the second press roller 120 by the feeding unit 170, and the strip-shaped negative electrode body 71x formed by the strip-shaped negative electrode body production apparatus 200 and extended over the second press roller 120 also moves toward the roller gap GA1. Then, in the roller gap GA1, the positive electrode plate 31 is placed on the strip-shaped negative electrode body 71x.

Specifically, a plurality of the positive electrode plates 31 are placed on the strip-shaped negative electrode body 71x at the predetermined intervals Da so as to be spaced apart from each other by the gap KG in the longitudinal direction IH. The predetermined interval Da between the positive electrode plates 31 adjacent to each other in the longitudinal direction IH is equal to each of the dimensions L2e, L3e, and L4e (see FIG. 3) in the short-side direction EH of the negative electrode plate 41, the first separator 51, and the second separator 61 (Da=L2e=L3e=L4e). In addition, the gap KG between the positive electrode plates 31 adjacent to each other in the longitudinal direction IH is equal to the difference between each of the dimensions L2e, L3e, and L4e in the short-side direction EH (L2e=L3e=L4e) of the negative electrode plate 41, the first separator 51, and the second separator 61 and the dimension L1e in the short-side direction EH of the positive electrode plate 31 (KG=L2e−L1e).

Moreover, each positive electrode plate 31 is placed on the strip-shaped negative electrode body 71x, and the positive electrode plate 31 and the strip-shaped negative electrode body 71x are roller-pressed by the first press roller 110 and the second press roller 120 to form the pressed strip-shaped laminated body 25. Specifically, in a state where the endless strip-shaped metal plate 131 extending in the conveyance direction JH is placed on the positive electrode plate 31 placed on the strip-shaped negative electrode body 71x, the positive electrode plate 31 and the strip-shaped negative electrode body 71x are roller-pressed by the first press roller 110 and the second press roller 120 to closely adhere the positive electrode plate 31 to the strip-shaped negative electrode body 71x, thereby forming the pressed strip-shaped laminated body 25.

The pressing step S7 is performed while the endless strip-shaped metal plate 131 is repeatedly placed on the positive electrode plate 31 placed on the strip-shaped negative electrode body 71x. In addition, the pressing step S7 is performed while the non-joined portion 131i of the endless strip-shaped metal plate 131 other than the joined portion 131g is placed on the first outer ridge portion 31ra and the second outer ridge portion 31rb of the positive electrode plate 31. Thus, the pressed strip-shaped laminated body 25 is formed.

As described above, by interposing the endless strip-shaped metal plate 131 in the pressing step S7, a portion, of the positive electrode plate 31, pressed by the first press roller 110 via the endless strip-shaped metal plate 131 spreads in the conveyance direction JH (the area of the pressed portion is widened). Thus, the pressure applied to the first outer ridge portion 31ra or the second outer ridge portion 31rb of the positive electrode plate 31 can be smaller than that in the conventional art (the case where the endless strip-shaped metal plate 131 is not interposed). Therefore, damage to the first outer ridge portion 31ra or the second outer ridge portion 31rb of the positive electrode plate 31 (such as a part of the positive electrode active material layer 33 falling off from the positive current collector foil 32) due to roller-pressing can be restrained.

When the pressure applied to the first outer ridge portion 31ra or the second outer ridge portion 31rb of the positive electrode plate 31 is decreased, the pressure with which the first inner ridge portion 31rc or the second inner ridge portion 31rd of the positive electrode plate 31 presses the strip-shaped first separator 51x of the strip-shaped negative electrode body 71x is also decreased. Thus, damage to a portion of the strip-shaped first separator 51x with which the first inner ridge portion 31rc or the second inner ridge portion 31rd of the positive electrode plate 31 is in contact (such as the strip-shaped first separator 51x being partially torn) can also be restrained.

Next, in the "cutting step S20" (see FIG. 6), the pressed strip-shaped laminated body 25 is cut by using a unit laminated body production apparatus 400 (see FIG. 11), to obtain the rectangular plate-shaped unit laminated bodies 21 in each of which the positive electrode plate 31, the first separator 51, the negative electrode plate 41, and the second separator 61 are laminated in this order. The unit laminated body production apparatus 400 is installed at the downstream side JH1 of the above-described laminated body pressing apparatus 100. The unit laminated body production apparatus 400 is an apparatus for cutting the pressed strip-shaped laminated body 25 at the predetermined intervals Da in the longitudinal direction IH. Specifically, the unit laminated body production apparatus 400 cuts the strip-shaped negative electrode body 71x of the pressed strip-shaped laminated body 25 at the middle between the positive electrode plates 31 adjacent to each other in the longitudinal direction IH. As a result of this, the unit laminated body 21 shown in FIG. 3 to FIG. 5 is formed.

Next, in the "laminating step S30" (see FIG. 6), the unit laminated bodies 21 are laminated one another by using a laminating apparatus 500 (see FIG. 11) to form the laminated electrode body 20. The laminating apparatus 500 is an apparatus for pressing a plurality of the thus laminated unit laminated bodies 21 by flat-pressing to closely adhere the unit laminated bodies 21 to one another. The laminating apparatus 500 includes an upper die 510 having a flat press surface 510n, and a lower die 520 having a flat press surface 520n that faces the press surface 510n of the upper die 510.

In the laminating step S30, a process of closely adhering the unit laminated bodies 21 to one another by flat-pressing is repeated to form the laminated electrode body 20. Specifically, one unit laminated body 21 is placed on another unit laminated body 21 having been laminated earlier. Then, the upper die 510 is moved down, and the plurality of unit laminated bodies 21 are pressed between the press surface 510n of the upper die 510 and the press surface 520n of the lower die 520 by flat-pressing to closely adhere the unit laminated body 21 to the other unit laminated body 21. The process of closely adhering a new unit laminated body 21 to another unit laminated body 21 laminated earlier as described above is repeatedly performed a predetermined number of times to form the laminated electrode body 20.

Next, in the "assembly step S200" (see FIG. 6), the battery 1 is assembled by using the above-described laminated electrode body 20. Specifically, the case lid member 13 is prepared, and the positive electrode terminal member 80 and the negative electrode terminal member 90 are fixed to the case lid member 13 (see FIG. 1). Then, the positive electrode current collector portions 31m of the respective positive electrode plates 31 of the laminated electrode body 20 are laminated on each other, and the positive electrode terminal member 80 is welded thereto. In addition, the negative electrode current collector portions 41m of the respective negative electrode plates 41 of the laminated electrode body 20 are laminated on each other, and the negative electrode terminal member 90 is welded thereto. Next, the laminated electrode body 20 is covered with an insulating film enclosure (not shown), the laminated electrode body 20 and the insulating film enclosure are inserted into the case body member 11, and an opening of the case body member 11 is closed with the case lid member 13. Then, the case body member 11 and the case lid member 13 are welded together to form the battery case 10. Then, the electrolyte 17 is injected into the battery case 10 through an injection hole 13h to impregnate the laminated electrode body 20 with the electrolyte 17. Then, the injection hole 13h is sealed with a sealing member 15. Then, various inspections and initial charging are performed on the battery 1. Thus, the battery 1 is completed.

As described above, the laminated body pressing apparatus 100 includes the metal plate feeding unit 130 in addition to the first press roller 110 and the second press roller 120, and the positive electrode plate 31 and the strip-shaped negative electrode body 71x are roller-pressed by the first press roller 110 and the second press roller 120 in a state where the strip-shaped metal plate (endless strip-shaped metal plate) 131 is placed on the positive electrode plate 31 placed on the strip-shaped negative electrode body 71x.

By interposing the endless strip-shaped metal plate 131 as described above, the portion, of the positive electrode plate 31, pressed by the first press roller 110 via the endless strip-shaped metal plate 131 spreads in the conveyance direction JH (the area of the pressed portion is widened), and thus the pressure applied to the first outer ridge portion 31ra or the second outer ridge portion 31rb of the positive electrode plate 31 can be smaller than that in the conventional art. Therefore, damage to the first outer ridge portion 31ra or the second outer ridge portion 31rb of the positive electrode plate 31 due to roller-pressing can be restrained.

When the pressure applied to the first outer ridge portion 31ra or the second outer ridge portion 31rb of the positive electrode plate 31 is decreased, the pressure with which the first inner ridge 31rc or the second inner ridge 31rd of the positive electrode plate 31 presses the strip-shaped first separator 51x of the strip-shaped negative electrode body 71x is also decreased. Thus, damage to the portion of the strip-shaped first separator 51x with which the first inner ridge portion 31rc or the second inner ridge portion 31rd of the positive electrode plate 31 is in contact can also be restrained.

In the present embodiment, the annular endless strip-shaped metal plate 131 is used as the strip-shaped metal plate, and the metal plate feeding unit 130 has the circulation path 135 through which the downstream portion 131d, of the endless strip-shaped metal plate 131, transferred to the downstream side JH1 of the roller gap GAL is returned to the upstream side JH2 of the roller gap GA1. Accordingly, the endless strip-shaped metal plate (strip-shaped metal plate) 131 can be easily repeatedly used, and roller-pressing can be efficiently performed to form the pressed strip-shaped laminated body 25.

Meanwhile, since the joined portion 131g of the endless strip-shaped metal plate 131 is a portion at which both end portions 132t of the strip-shaped metal plate 132 are joined to each other, if the joined portion 131g is placed on the first outer ridge portion 31ra or the second outer ridge portion 31rb of the positive electrode plate 31 during roller-pressing, damage to the first outer ridge portion 31ra or the second outer ridge portion 31rb and damage to the strip-shaped first separator 51x may be promoted.

In contrast, in the present embodiment, the circumferential length La of the endless strip-shaped metal plate 131 is set to a length that is an integer multiple of the predetermined interval Da between the positive electrode plates 31 placed on the strip-shaped negative electrode body 71x, and the non-joined portion 131i of the endless strip-shaped metal plate 131 is made to be placed on the first outer ridge portion 31ra and the second outer ridge portion 31rb of the positive electrode plate 31 (the joined portion 131g is made not to be placed thereon) by the joined-portion detection unit 140, the positive electrode plate detection unit 150, and the control unit 160. Accordingly, the first outer ridge portion 31ra or the second outer ridge portion 31rb of the positive electrode plate 31 and the strip-shaped first separator 51x can be appropriately restrained from being damaged during roller-pressing.

If the thickness T1 of the endless strip-shaped metal plate (strip-shaped metal plate) 131 is excessively small, specifically, smaller than three times the thickness T2 of the positive electrode plate 31, the effect achieved by interposing the endless strip-shaped metal plate 131 is reduced, so that the effect of inhibiting damage to the first outer ridge portion 31ra or the second outer ridge portion 31rb of the positive electrode plate 31 and damage to the strip-shaped first separator 51x is reduced.

On the other hand, if the thickness T1 of the endless strip-shaped metal plate 131 is excessively large, specifically, larger than eight times the thickness T2 of the positive electrode plate 31, the portion, of the positive electrode plate 31, pressed by the first press roller 110 via the endless strip-shaped metal plate 131 excessively spreads in the conveyance direction JH (the area of the pressed portion is excessively widened), and the pressure applied to the positive electrode plate 31 is decreased. Thus, the close adhesiveness of each positive electrode plate 31 to the strip-shaped negative electrode body 71x after roller-pressing is likely to be decreased.

In contrast, in the present embodiment, since the thickness T1 of the endless strip-shaped metal plate (strip-shaped metal plate) 131 is three to eight times the thickness T2 of the positive electrode plate 31 ($3 \times T2 \leq T1 \leq 8 \times T2$), the first outer ridge portion 31ra or the second outer ridge portion 31rb of the positive electrode plate 31 and the strip-shaped first separator 51x can be more effectively restrained from being damaged, and the close adhesiveness of each positive electrode plate 31 to the strip-shaped negative electrode body 71x after roller-pressing can be enhanced.

In the method for manufacturing the laminated electrode body 20 of the present embodiment, the pressed strip-shaped laminated body 25 is produced in the strip-shaped laminated body production step S10 as described above, and the pressed strip-shaped laminated body 25 is cut in the cutting step S20 to obtain the unit laminated bodies 21. Accordingly, the unit laminated bodies 21 in each of which damage to the first outer ridge portion 31ra or the second outer ridge portion 31rb of the positive electrode plate 31 and damage to the strip-shaped first separator 51x are restrained can be obtained. By using the unit laminated bodies 21 in the laminating step S30, the reliable laminated electrode body 20 can be produced.

In the method for manufacturing the battery 1 of the present embodiment, the laminated electrode body 20 is formed in the electrode body production step S100 as described above, and thus the laminated electrode body 20 in which damage to the first outer ridge portion 31ra or the second outer ridge portion 31rb of each positive electrode plate 31 and damage to each strip-shaped first separator 51x are restrained can be formed. By using the laminated electrode body 20 in the assembly step S200, the reliable battery 1 can be produced.

While the present disclosure has been described above based on the embodiment, it should be understood that the present disclosure is not limited to the embodiment but can be applied with modifications appropriately made thereto without departing from the scope of the gist of the present disclosure.

For example, in the embodiment, the strip-shaped negative electrode body 71x in which the separately produced strip-shaped first separator 51x and strip-shaped second separator 61x are placed on both principal surfaces of the strip-shaped negative electrode plate 41x has been described as an example of the "strip-shaped negative electrode body", but the strip-shaped negative electrode body is not limited thereto. For example, the strip-shaped negative electrode body may be a strip-shaped negative electrode body in which a porous first strip-shaped separator layer and a porous second strip-shaped separator layer are formed on both principal surfaces of the strip-shaped negative electrode plate 41x by applying a resin paste to both principal surfaces of the strip-shaped negative electrode plate 41x and drying the resin paste.

In the embodiment, in the roller gap GA1 between the first press roller 110 and the second press roller 120 of the laminated body pressing apparatus 100, the positive electrode plate 31 is placed on the strip-shaped negative electrode body 71x and roller-pressed together with the endless strip-shaped metal plate 131 to form the pressed strip-shaped laminated body 25, but the method for forming the pressed strip-shaped laminated body 25 is not limited thereto. For example, prior to roller-pressing by the first press roller 110 and the second press roller 120, the positive electrode plate 31 may be placed on the strip-shaped negative electrode body 71x to form a strip-shaped laminated body to be pressed. Then, the endless strip-shaped metal plate 131 may be placed on the positive electrode plate 31 of the strip-shaped laminated body to be pressed, and roller-pressed by the first press roller 110 and the second press roller 120 to form the pressed strip-shaped laminated body 25.

In the embodiment, the endless strip-shaped metal plate 131 is used. However, a long strip-shaped metal plate may be placed on the positive electrode plate 31 and roller-pressed.

REFERENCE SIGNS LIST

1 Battery
20 Laminated electrode body
21 Unit laminated body
25 Pressed strip-shaped laminated body
31 Positive electrode plate
31x Strip-shaped positive electrode plate
31a First positive electrode plate principal surface
31b Second positive electrode plate principal surface
31t1 First positive electrode plate end surface
31t2 Second positive electrode plate end surface
31ra First outer ridge portion
31rb Second outer ridge portion
31rc First inner ridge portion
31rd Second inner ridge portion
41 Negative electrode plate
41x Strip-shaped negative electrode plate
51 First separator
51x Strip-shaped first separator
61 Second separator
61x Strip-shaped second separator
71 Negative electrode body
71x Strip-shaped negative electrode body
100 Laminated body pressing apparatus
110 Frist press roller
120 Second press roller
130 Metal plate feeding unit
131 Endless strip-shaped metal plate (strip-shaped metal plate)
131g Joint
131i Non-joined portion
131d Downstream portion
132 Metal plate
132t End portion
133 Transfer roller
135 Circulation path
140 Joint detection unit
150 Positive electrode plate detection unit
160 Control unit
170 Feeding unit
200 Strip-shaped negative electrode body production apparatus
300 Rectangular positive electrode plate production apparatus
400 Unit laminated body production apparatus
500 Laminating apparatus
GH Laminating direction
IH Longitudinal direction
JH Conveyance direction
JH1 Downstream side (of the conveyance direction)
JH2 Upstream side (of the conveyance direction)
GA1 Roller gap (between the first press roller and the second press roller)
La Circumferential length
Da Predetermined interval (between the positive electrode plates placed on the strip-shaped negative electrode body)
KG Gap (between the positive electrode plates placed on the strip-shaped negative electrode body)
T1 Thickness (of the endless strip-shaped metal plate)
T2 Thickness (of the positive electrode plate)
S5 Strip-shaped negative electrode body formation step
S6 Rectangular positive electrode plate formation step
S7 Pressing step
S10 Strip-shaped laminated body production step
S20 Cutting step
S30 Laminating step
S100 Electrode body production step
S200 Assembly step

What is claimed is:

1. A method for manufacturing a laminated electrode body in which a plurality of rectangular positive electrode plates and a plurality of rectangular negative electrode plates are alternately laminated with rectangular separators interposed therebetween, the method comprising:

a strip-shaped laminated body production step of producing a pressed strip-shaped laminated body formed by placing the plurality of rectangular positive electrode plates on a strip-shaped negative electrode body having a strip-shaped negative electrode plate disposed between a pair of strip-shaped separators at a predetermined interval so as to be spaced apart from each other by a gap in a longitudinal direction of the strip-shaped negative electrode body, and by roller-pressing the positive electrode plates and the strip-shaped negative electrode body:

a cutting step of cutting the pressed strip-shaped laminated body to obtain rectangular plate-shaped unit laminated bodies in each of which a positive electrode plate of the plurality of rectangular positive electrode plates, a first separator of the rectangular separators, a negative electrode plate of the plurality of rectangular negative electrode plates, and a second separator of the rectangular separators are laminated in this order; and a laminating step of laminating the unit laminated bodies on each other to form the laminated electrode body, wherein the strip-shaped laminated body production step comprises a pressing step of, in a state where a strip-shaped metal plate extending in a conveyance direction is disposed on one of the positive electrode plates disposed on the strip-shaped negative electrode body, roller-pressing the strip-shaped metal plate, the one positive electrode plate, and the strip-shaped negative electrode body by passing the strip-shaped metal plate, the one positive electrode plate, and the strip-shaped negative electrode body through a roller gap between a first press roller and a second press roller disposed parallel to the first press roller, to form the pressed strip-shaped laminated body the strip-shaped metal plate is an annular endless strip-shaped metal plate, the pressing step is performed while the endless strip-shaped metal plate is repeatedly placed on the positive electrode plates placed on the strip-shaped negative electrode body the endless strip-shaped metal plate has a circumferential length that is an integer multiple of the predetermined interval, the endless strip-shaped metal plate has a joined portion at which both end portions of the strip-shaped metal plate are joined to each other, and the pressing step is performed while a non-joined portion of the endless strip-shaped metal plate other than the joined portion is placed on a first outer ridge portion of the positive electrode plate formed by a first positive electrode plate principal surface exposed to an outside and a first positive electrode plate end surface facing a downstream side in the conveyance direction, and a second outer ridge portion of the positive electrode plate formed by the first positive electrode plate principal surface and a second positive electrode plate end surface facing an upstream side in the conveyance direction.

2. The method for manufacturing a laminated electrode body according to claim 1, wherein the strip-shaped metal plate has a thickness T1 that is three to eight times a thickness T2 of the positive electrode plate.

3. A method for manufacturing a battery including a laminated electrode body in which a plurality of rectangular positive electrode plates and a plurality of rectangular negative electrode plates are alternately laminated with rectangular separators therebetween, the method comprising:

a strip-shaped laminated body production step of producing a pressed strip-shaped laminated body formed by placing the plurality of rectangular positive electrode plates on a strip-shaped negative electrode body having a strip-shaped negative electrode plate disposed between a pair of strip-shaped separators at a predetermined interval so as to be spaced apart from each other by a gap in a longitudinal direction of the strip-shaped negative electrode body, and by roller-pressing the positive electrode plates and the strip-shaped negative electrode body;

a cutting step of cutting the pressed strip-shaped laminated body to obtain rectangular plate-shaped unit laminated bodies in each of which a positive electrode plate of the plurality of rectangular positive electrode plates, a first separator of the rectangular separators, a negative electrode plate of the plurality of rectangular negative electrode plates, and a second separator of the rectangular separators are laminated in this order;

a laminating step of laminating the unit laminated bodies on each other to form the laminated electrode body, and an assembly step of assembling the battery by using the laminated electrode body; wherein the strip-shaped laminated body production step comprises a pressing step of, in a state where a strip-shaped metal plate extending in a conveyance direction is disposed on one of the positive electrode plates disposed on the strip-shaped negative electrode body, roller-pressing the strip-shaped metal plate, the one positive electrode plate, and the strip-shaped negative electrode body by passing the strip-shaped metal plate, the one positive electrode plate, and the strip-shaped negative electrode body through a roller gap between a first press roller and a second press roller disposed parallel to the first press roller, to form the pressed strip-shaped laminated body;

the endless strip-shaped metal plate has a circumferential length that is an integer multiple of the predetermined interval, the endless strip-shaped metal plate has a joined portion at which both end portions of the strip-shaped metal plate are joined to each other, the pressing step is performed while a non-joined portion of the endless strip-shaped metal plate other than the joined portion is placed on a first outer ridge portion of the positive electrode plate formed by a first positive electrode plate principal surface exposed to an outside and a first positive electrode plate end surface facing a downstream side in the conveyance direction, and a second outer ridge portion of the positive electrode plate formed by the first positive electrode plate principal surface and a second positive electrode plate end surface facing an upstream side in the conveyance direction;

the strip-shaped metal plate is an annular endless strip-shaped metal plate, and the pressing step is performed while the endless strip-shaped metal plate is repeatedly placed on the positive electrode plate placed on the strip-shaped negative electrode body.

4. The method for manufacturing the pressed strip-shaped laminated body according to claim 3, wherein the strip-shaped metal plate has a thickness T1 that is three to eight times a thickness T2 of the positive electrode plate.

* * * * *